US012709562B2

(12) United States Patent
Steward et al.

(10) Patent No.: US 12,709,562 B2
(45) Date of Patent: Aug. 18, 2026

(54) DEWATERING METHOD AND SYSTEM

(71) Applicant: Weir Minerals Australia Ltd., Artarmon (AU)

(72) Inventors: Nils Richard Steward, Black Rock (AU); Dean Stephenson, Maidstone (AU)

(73) Assignee: Weir Minerals Australia LTD., Artarmon (AU)

(*) Notice: Subject to any disclaimer, the term of this patent is extended or adjusted under 35 U.S.C. 154(b) by 758 days.

(21) Appl. No.: 17/272,863

(22) PCT Filed: Sep. 4, 2019

(86) PCT No.: PCT/AU2019/050941
§ 371 (c)(1),
(2) Date: Mar. 2, 2021

(87) PCT Pub. No.: WO2020/047592
PCT Pub. Date: Mar. 12, 2020

(65) Prior Publication Data

US 2021/0214255 A1 Jul. 15, 2021

(30) Foreign Application Priority Data

Sep. 4, 2018 (AU) ................................ 2018903278

(51) Int. Cl.
*C02F 9/00* (2023.01)
*B01F 23/50* (2022.01)
(Continued)

(52) U.S. Cl.
CPC ................ *C02F 9/00* (2013.01); *B01F 23/54* (2022.01); *B04B 1/00* (2013.01); *B04C 3/04* (2013.01);
(Continued)

(58) Field of Classification Search
None
See application file for complete search history.

(56) References Cited

U.S. PATENT DOCUMENTS 3,800,946 A 4/1974 Reid et al.
3,912,579 A 10/1975 Braun
5,316,664 A 5/1994 Gregoli et al.
5,340,467 A 8/1994 Gregoli et al.
9,186,604 B1 * 11/2015 Jons .......................... B04C 5/04
(Continued)

FOREIGN PATENT DOCUMENTS

CA 2524088 A1 4/2006
CA 2707197 C 7/2012
(Continued)

*Primary Examiner* — Benjamin M Kurtz
(74) *Attorney, Agent, or Firm* — Morriss O'Bryant; Compagni Cannon, PLLC

(57) ABSTRACT

The present invention relates to methods for dewatering tailings and systems for performing same. In certain aspects, the invention relates to methods of producing a dewatered tailings residue or a stackable tailings residue, comprising subjecting tailings to hydrocyclonic separation to produce one or more partially dewatered underflows and a final water-rich overflow; separating the final water-rich overflow, by centrifuging, into a recovered water stream and a low-water residue; and mixing together the low-water residue and at least part of the one or more partially dewatered underflows to produce a dewatered tailings residue or a stackable tailings residue.

14 Claims, 11 Drawing Sheets

(51) Int. Cl.

| | |
|---|---|
| ***B01F 101/50*** | (2022.01) |
| ***B04B 1/00*** | (2006.01) |
| ***B04C 3/04*** | (2006.01) |
| ***B04C 9/00*** | (2006.01) |
| ***C02F 1/38*** | (2023.01) |
| ***C02F 11/127*** | (2019.01) |
| ***C02F 103/10*** | (2006.01) |

(52) U.S. Cl.
CPC .............. *B04C 9/00* (2013.01); *B01F 23/581* (2022.01); *B01F 2101/50* (2022.01); *B04C 2009/005* (2013.01); *C02F 1/385* (2013.01); *C02F 11/127* (2013.01); *C02F 2103/10* (2013.01); *C02F 2301/04* (2013.01); *C02F 2301/06* (2013.01)

(56) References Cited

U.S. PATENT DOCUMENTS

| | | | | |
|---|---|---|---|---|
| 2008/0000810 | A1 | 1/2008 | Garner et al. | |
| 2011/0094970 | A1 | 4/2011 | Kincaid et al. | |
| 2012/0313038 | A1* | 12/2012 | Laros | C02F 11/147 252/194 |
| 2015/0158032 | A1 | 6/2015 | Nelson et al. | |
| 2017/0036929 | A1 | 2/2017 | Witham et al. | |

FOREIGN PATENT DOCUMENTS

| | | | |
|---|---|---|---|
| CA | 2940886 | A1 | 3/2018 |
| CN | 107352678 | A | 11/2017 |
| JP | 2018122279 | A | 8/2018 |
| WO | 2010144939 | A1 | 12/2010 |

* cited by examiner

DEWATERING METHOD AND SYSTEM

TECHNICAL FIELD

The present invention relates to methods for dewatering tailings and systems for performing same.

BACKGROUND

Tailings storage facilities are used to store mine tailings, which is waste material discharged from a mining operation, such as an ore processing plant or coal preparation plant. Wet tailings (e.g. slurries) may be stored in reservoirs such as dams, ponds, diversion channels, spillways and seepage collection trenches so that it dewaters gradually through sedimentation, drainage and evaporation. A traditional tailings pond takes up a large area of land and requires a great deal of maintenance and monitoring. In addition, the storage of wet tailings is subject to increasing scrutiny in the light of the risks of seepage of tailings liquor, overflow or leakage of tailings liquor, or an abrupt failure of the tailings storage facilities. Tailings spills, dam failures, seepages, and direct discharges to waterways have resulted in severe and long-term environmental and social consequences.

In addition, it is increasingly desirable to enhance water recovery, particularly where mining operations are located in areas where there is a scarcity of water. Accordingly, processes have been developed for dewatering tailings to allow water to be recovered and produce substantially dewatered tailings. The substantially dewatered tailings can be suitable for disposing through so called "dry" stacking.

Dry stack facilities may be easier to close and rehabilitate, and require a smaller footprint, compared to other surface tailings storage options, as dewatering the tailings produces a higher density waste product. In addition, "dry" stacking may be used in environments where wet tailings storage facilities may be unsuitable, such as undulating and steep terrain.

Known dewatering processes for producing a stackable tailings residue use filters, such as vacuum filters or filter presses, to produce a dewatered filter cake that meets the geotechnical requirements for stacking the dewatered product. However, the high capital costs and operating costs of filtration facilities can limit the conversion from wet tailings storage to "dry" stacking.

Filtration facilities can have relatively limited throughput. Also, the filter cake can require significant rehandling to construct the stack geometries, such as being conveyed or trucked to the tailings storage facility and then moved into the final position on the dry stack using earth moving equipment.

It is desired to address one or more of the above or at least provide a useful alternative thereto.

SUMMARY

The present invention relates to a method for dewatering tailings and a system for performing same.

In a first aspect, the present invention relates to a method and a system for dewatering tailings in order to produce a stackable tailings residue. The production of a stackable tailings residue may facilitate the transport, disposal and deposition of the tailings.

In the first aspect, the present invention provides a method of producing a stackable tailings residue, comprising: subjecting tailings to hydrocyclonic separation to produce one or more partially dewatered underflows and a final water-rich overflow; separating the final water-rich overflow, by centrifuging, into a recovered water stream and a low-water residue; and mixing together the low-water residue and at least part of the one or more partially dewatered underflows to produce a stackable tailings residue.

Typically, there is a plurality of hydrocyclonic separation stages. Accordingly, in some embodiments, the hydrocyclonic separation has a plurality of hydrocyclonic separation stages, including a first stage and a final stage; each hydrocyclonic separation stage separates an input into one of the one or more partially dewatered underflows and a water-rich overflow; the input of the first stage comprises the tailings; the water-rich overflow of each stage preceding the final stage is an input to the next adjacent stage; and the final water-rich overflow is the water-rich overflow of the final stage.

In some embodiments, a process generated the tailings and the method comprises: providing the recovered water stream to the process for reuse.

In addition, the present invention provides a system for producing a stackable tailings residue, comprising: a hydrocyclonic separation unit for subjecting tailings to hydrocyclonic separation to produce one or more partially dewatered underflows and a final water-rich overflow; a centrifuge unit comprising at least one centrifuge configured for separating the final water-rich overflow into a recovered water stream and a low-water residue; and a mixer for mixing together the low-water residue and at least part of the one or more partially dewatered underflows to produce a stackable tailings residue.

In some embodiments of the system, the hydrocyclonic separation has a plurality of hydrocyclonic separation stages, including a first stage and a final stage; for each stage, the hydrocyclonic separation unit has a sub-unit comprising at least one hydrocyclone for separating an input into one of the one or more partially dewatered underflows and a water-rich overflow; the sub-unit for the first stage is configured so that the input of the first stage comprises the tailings; and the sub-units are configured for providing the water-rich overflow of each stage preceding the final stage as an input to the next adjacent stage; and the sub-unit for the final stage is configured for providing the final water-rich overflow to the centrifuge unit.

In some embodiments, a process generated the tailings and the system comprises a recovered water line, fluidly connected to the centrifuge unit, for providing the recovered water stream to the process for reuse.

A stackable tailings residue, produced in accordance with the method of the present invention, is also provided.

The present invention further provides a method for disposing tailings comprising: producing, from tailings, a stackable tailings residue in accordance with the method of the present invention; and pumping the stackable tailings residue to a disposal site. Also provided is a system for disposing tailings, comprising: a system for producing, from tailings, a stackable tailings residue in accordance with the system of the present invention; and a pump fluidly connected to a disposal site and configured for pumping the stackable tailings residue to the disposal site.

In addition, there is provided a stack comprising a stackable tailings residue disposed in accordance with the method of the present invention for disposing tailings.

In the first aspect, the present invention relates to a method and a system for dewatering tailings in order to produce a stackable tailings residue. It will be appreciated that, by adjusting operating parameters, the method and the system of the first aspect may be used to prepare residues that are not stackable but are still dewatered. Thus, in a second aspect, the present invention provides a method and a system for dewatering tailings in order to produce a dewatered tailings residue.

In particular, the second aspect of the present invention provides a method of producing a dewatered tailings residue, comprising subjecting tailings to hydrocyclonic separation to produce one or more partially dewatered underflows and a final water-rich overflow; separating the final water-rich overflow, by centrifuging, into a recovered water stream and a low-water residue; and mixing together the low-water residue and at least part of the one or more partially dewatered underflows to produce a dewatered tailings residue.

The second aspect of the present invention also provides a system for producing a dewatered tailings residue, comprising a hydrocyclonic separation unit for subjecting tailings to hydrocyclonic separation to produce one or more partially dewatered underflows and a final water-rich overflow; a centrifuge unit comprising at least one centrifuge configured for separating the final water-rich overflow into a recovered water stream and a low-water residue; and a mixer for mixing together the low-water residue and at least part of the one or more partially dewatered underflows to produce a dewatered tailings residue.

In some embodiments, the partially dewatered underflow may be highly dewatered. This highly dewatered underflow may be a useful product in its own right. Thus, in some embodiments of the first and second aspects, in which there are two or more stages of hydrocyclonic separation, at least some of the one or more partially dewatered underflows of one of the plurality of hydrocyclonic separation stages is collected as a highly dewatered product. In some embodiments, there is provided a system wherein one of the sub-units of the hydrocyclonic separation unit has a product line configured for collecting at least some of the one or more partially dewatered underflows from said sub-unit as a highly dewatered product.

As noted above, both the first and send aspects of the invention may have embodiments in which the hydrocyclonic separation is used to prepare a highly dewatered product. Thus, in a third aspect of the present invention, there is provided a method of producing a highly dewatered product, comprising: feeding an aqueous slurry or sludge to a hydrocyclone at a high feed inlet pressure, said aqueous slurry or sludge comprising particulate solid material; and subjecting the aqueous slurry or sludge to hydrocyclonic separation to produce an underflow and an overflow, said underflow being a highly dewatered product.

The present invention also provides a highly dewatered product, collected in accordance with come embodiments of the first and second aspect. In addition, the present invention provides a highly dewatered product produced in accordance with the method of the third aspect.

BRIEF DESCRIPTION OF THE DRAWINGS

Various embodiments of the present invention are described, by way of example only, with reference to the following drawings.

DETAILED DESCRIPTION

Figure 1:
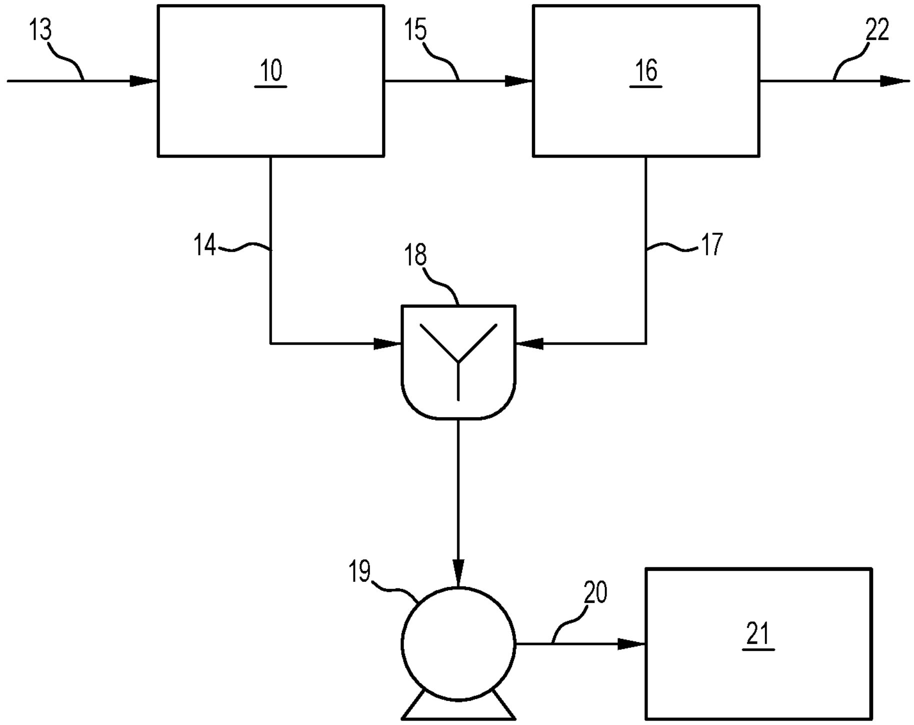
FIG. 1 is schematic illustration of a system in accordance with one embodiment.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

As used herein, the singular forms “a,” “an,” and “the” designate both the singular and the plural, unless expressly stated to designate the singular only.

The term “about” and the use of ranges in general, whether or not qualified by the term about, means that the number comprehended is not limited to the exact number set forth herein, and is intended to refer to ranges substantially within the quoted range while not departing from the scope of the invention. As used herein, “about” will be understood by persons of ordinary skill in the art and will vary to some extent on the context in which it is used. If there are uses of the term which are not clear to persons of ordinary skill in the art given the context in which it is used, “about” will mean up to plus or minus 10% of the particular term.

In addition, where dimensions are described herein, it will be appreciated that plus or minus (±) typical manufacturing tolerances are applicable to those values. As appreciated by those in the art, manufacturing tolerances may be determined to achieve a desired mean and standard deviation of manufactured components in relation to the ideal component profile.

As noted above, tailings are a waste material. Tailings may be an aqueous slurry or sludge comprising particulate mineral material, for instance clay, shale, sand, grit, oil sand tailings, metal oxides etc. admixed with water. Tailings may also be various sludges and other liquid/solid materials that need to be dewatered and transported.

The tailings may originate from a number of different processes, including, but not limited to, various mining operations. Thus, in some embodiments, the process may be selected from a mining process, a refining process, a smelting process and a water treatment process. The present invention may be particularly suited to dewatering tailings from coal mining operations, gold mining operations, base metal mining operations, platinum group metal mining operations, and/or alkali metal mining operations, including mining operations to recover lithium.

Tailings are typically slurries with a relatively low percentage of solids and relatively high water content. For example, tailings that may be dewatered using the present invention, such as tailings from hard rock mining, may have an initial solids content of 20 wt % to 60 wt % (i.e. up to 80 wt % moisture). For example, the tailings may have a solids content of about 40 wt % to 60 wt %, such as about 56 wt %.

Materials used for "dry" stacking are not necessarily free of water, but have instead been dewatered sufficiently to enable the residue to be stacked. The term "stackable tailings residue", as used herein, refers to a residue that has been sufficiently dewatered so that it can subsequently stand in a substantial pile and be rehandled by conventional earth moving equipment without liquefying. A stackable tailings residue may have been dewatered to produce a product held together by the mechanical interlocking of the particles through packing and particle-particle friction. The stackable tailings residue may be capable of being handled mechanically immediately after manufacture owing to its mechanically interlocked state, and dewatered state, which prevents free flowing of the product. The residue may under certain conditions appear to be "dry".

Ideally, no water will bleed from a stackable tailings residue. Instead, any water in the stackable tailings residue is interstitial water, contained in the interstices between the particles, or water bound to the particle surface.

The amount of interstitial water that can be contained in a stackable tailings residue is dependent on a number of characteristics of the particles in the tailings including particle size distribution (PSD), particle surface area, mineralogy, shape, surface charge and specific gravity.

An assessment of whether a tailings residue is stackable may be conducted using methods of evaluating soil mechanics that will be known to persons skilled in the art of geomechanical engineering. Suitable testing methods may include static and dynamic shear testing to determine the shear strength of the residue, and measurements of moisture content and porosity. For example, the assessment of the tailings residue may include shear vane testing, unconfined compression testing, fall cone testing and cone penetration testing.

In the present invention, as water is removed from the tailings, the dewatered residue (which may be a partially dewatered underflow, low-water residue or the final stackable tailings residue) approaches 100% water saturation, at which point the capillary tension between the particles will have increased to a maximum. That is, at the water/solids ratio where the capillary water tension is greatest, minimum porosity is attained, i.e. when the particles are pulled together with the greatest water tension. As a stackable tailings residue desiccates, which may occur following deposition at a disposal site, the capillary action of the interstitial water may draw the particles of the residue together.

As the moisture content of the dewatered residue decreases below the saturation point, air may displace water and decrease the water tension capability. Interstitial water may concentrate at particle contact points forming water bridges and binding the grains together owing to water tension.

In some embodiments, it may be desirable to produce a stackable tailings residue with a moisture content at, or just below, the content at which maximum capillary tension and minimum porosity occurs. A product having a higher moisture content than the moisture content at maximum capillary tension is undesirable as the additional water reduces the tension, effectively dilutes the suspension and increases the porosity by separating the particles.

In some embodiments, the porosity of the stackable tailings residue, when at minimum porosity, may be from about 9% to about 41%. The stackable tailings residue produced may have a porosity within 5 percentage points of the minimum porosity, preferably within 2 percentage points of the minimum porosity.

Non-cohesive tailings (e.g. tailings rich in gravel or sand) may be used to form a stackable tailings residue with a moisture content of 10 wt % to 20 wt %. Cohesive tailings (e.g. tailings rich in loam, clay or silt) may be used to form a stackable tailings residue with a moisture content of 35 wt % or more, for example up to 40 wt %. However, tailings with a very high clay content may be unsuitable for dewatering using the present invention due to the high water content of swollen clay particles resulting from crystalline swelling and/or osmotic/double layer swelling.

In some embodiments, the stackable tailings residue has a moisture content of about 10 wt % to about 25 wt %. In some embodiments, the stackable tailings residue may have a moisture content of about 15 wt % to about 25 wt %. In some embodiments, the stackable tailings residue may have a moisture content of about 20 wt %, such as (20±1) %, or (20±0.75) wt % or (20±0.5) wt %. That is, in some embodiments, the stackable tailings residue has a solids content of about 75 wt % to about 90 wt %. In some embodiments, the stackable tailings residue may have a solids content of about 75 wt % to about 85 wt %. In some embodiments, the stackable tailings residue may have a solids content of about 80 wt %, such as (80±1) %, or (80±0.75) wt % or (80±0.5) wt %.

In some embodiments, the tailings may include crushed particles.

The tailings particles may contain over 85 wt % $SiO_2$.

The particle size distribution of the tailings is dependent on the composition of the tailings, as well as the nature of the upstream processing. For example, when the tailings are from a mining process, the particle size distribution can depend on the ore and the mining process that is used. Some mining processes require fine milling in order to recover the desired mineral. In other processes, less milling may be required. In addition, the level of milling and the resultant particle size distribution can vary over the lifetime of a mine. Typically, the tailings will be such that all particles have a diameter of less than 2-3 mm. In some embodiments, all particles have a diameter of less than 600 microns. In some embodiments, all particles have a diameter of less than 300 microns. In some embodiments, the particles may have a diameter of 75 microns to 300 microns. Alternatively, the particles may have a diameter of 75 microns or less.

The dewatering method of the first aspect of the present invention utilises two separation techniques to separate water from the tailings and produce a stackable tailings residue: hydrocyclonic separation and centrifuging. In the second aspect, these two separation techniques are used to separate water from the tailings and produce a dewatered tailings residue (i.e. a tailings residue that is still dewatered, and may be highly dewatered, but is more fluent that a stackable tailing residue). In some embodiments, the centrifuging may be solid bowl centrifuging. It will be appreciated that solid bowl centrifuging can be used alone to dewater tailings so as to produce a stackable tailings residue. However, in practice, such as in commercial-scale operations, the use of solid bowl centrifuging alone may be impracticable due to excessive capital expenditure, operating expenditure and wear on the centrifuge.

In the present invention, centrifuging is combined with hydrocyclonic separation so as to reduce the loading on the centrifuge such that its use in dewatering tailings may be commercially viable. Wear on the centrifuge is, in part, a product of the velocity and particle size of material in the centrifuge. When larger particles are in the feed to the centrifuge, they impart more energy into the wall of the centrifuge and increase wear.

In the method of the present invention, the initial dewatering stage is performed using hydrocyclonic separation. By combining centrifuging with the initial stage of hydrocyclonic separation, the larger particles in the tailings may be separated into the partially dewatered underflow(s) of the hydrocyclonic separation so that the input into the centrifuge has smaller particles. By treating a fraction with a smaller particle size than the original tailings, the longevity of the centrifuge may be enhanced.

Hydrocyclonic separation alone may not adequately dewater the tailings to produce a stackable tailings residue. Accordingly, the method of the first aspect invention may utilise centrifuge separation to producing a low-water residue with a lower water content than the target moisture content for the stackable tailings residue. The low-water residue can then be combined with the, or each, partially dewatered underflow from the hydrocyclonic separation to produce the stackable tailings residue. Thus, the low-water residue may have a lower moisture content than the, or each, partially dewatered underflow from the hydrocyclonic separation.

In the second aspect of the present invention, the degree of dewatering performed by hydrocyclonic separation and centrifuging may be selected to produce a dewatered tailings residue with a preferred water content and particle size distribution. In general, it may be desirable to dewater the tailings as much possible to minimise excess water being placed into the tailings storage. However, in some embodiments, a stackable tailings residue may be relatively more difficult to transport to the disposal site. Common methods of transporting tailings (or tailings residues) to disposal sites are: pumped pipeline systems; gravitation pressure pipeline systems; channelling (laundering); conveyors; and truck.

Pumped pipeline systems, gravitation pressure pipeline system, and channelling (laundering) are typically suited to fluent products. Pumped pipeline systems use centrifugal or positive displacement pumping systems to transport tailings (or tailings residues). Where the storage facility is at a lower elevation compared to the processing plant, a gravitation pressure pipeline system can be used to transport the tailings (or tailings residue) without the need of a pumping system. Laundering uses an open (or capped) launder system where tailings flow gravitationally. In some embodiments, the stackable tailings residue may be pumpable. However, in other embodiments, it may be desirable to produce a more fluent (less dewatered) product that can be transported using existing transport systems. Thus, in some embodiments of the second aspect of the present invention, the degree of dewatering may be balanced against the requirements of the transportation system to provide a dewatered tailings residue that is readily transportable while also reducing the volume of tailings residue being sent for disposal.

Conveyors and trucks may be particularly suitable for transporting stackable tailings residues to a disposal site.

The hydrocyclonic separation may have a plurality of stages, including a first stage and a final stage. In such embodiments, for each stage, the hydrocyclonic separation unit of the system of the present invention may have a sub-unit comprising at least one hydrocyclone for separating an input into a partially dewatered underflow and a water-rich overflow.

In some embodiments, there may be three or more stages of hydrocyclonic separation.

Each hydrocyclonic separation sub-unit may include one or more hydrocyclones. Where there are two or more hydrocyclones in a sub-unit, the hydrocyclones can be connected in parallel. For example, two or more hydrocyclones may be connected in parallel to achieve the desired volumetric throughput for the system. That is, the number of hydrocyclones in each sub-unit may be selected based upon the desired volumetric throughput for the system.

Hydrocyclones are used for separating suspended matter carried in a flowing liquid input into two discharge streams by creating centrifugal forces within the hydrocyclone as the input passes through a conical shaped chamber. Basically, hydrocyclones include a conical separating chamber, a feed inlet which is usually generally tangential to the axis of the separating chamber and is disposed at the end of the chamber of greatest cross-sectional dimension, an underflow outlet at the smaller end of the chamber (including a spigot), and an overflow outlet at the larger end of the chamber (including a vortex finder).

The types of hydrocyclones that may be useful in embodiments of the present invention include conical hydrocyclones or flat bottom hydrocyclones. Conical hydrocyclones with a range of different cone slopes may be suitable for use in the present invention. The cone slope may be selected based upon the tailings to be dewatered. In some embodiments, the hydrocyclonic separation unit may include a combination of two or more different types of hydrocyclones.

In addition, the configuration of the vortex finder of the hydrocyclone may be selected based on the type of tailings and the location of the system (and the disposal site for the stackable tailings residue) so as to provide suitable dewatering performance. Pressure drop and separation efficiency may be affected by vortex finder depth. In some embodiments, it may be desirable to select a longer vortex finder than that selected for typical classification processes using a hydrocyclone. Similarly, the configuration of the spigot based on the type of tailings and the location so as to provide suitable dewatering performance. Methods of optimising the vortex finder and/or spigot will be apparent to those skilled in the art in view of the present disclosure.

The feed inlet of the hydrocyclone is adapted to deliver the input into the hydrocyclone separating chamber, and the arrangement is such that the heavy (for example, denser and coarser) material tends to migrate towards the outer wall of the chamber and towards and out through the centrally located underflow outlet. The lighter (less dense or finer particle sized) material migrates towards the central axis of the chamber and out through the overflow outlet. In the present invention, the, or each, hydrocyclonic separation stage separates an input into a partially dewatered underflow and a water-rich overflow.

In embodiments with two or more hydrocyclonic separation stages, the input of the first stage comprises the tailings, while the water-rich overflow of each stage preceding the final stage is an input to the next adjacent stage.

The overflow discharge point of each hydrocyclone is typically connected to atmosphere to avoid any back pressure, or equally vacuum, being generated, as this can adversely affect hydrocyclone performance. That is, after each hydrocyclone there is a pressure break to ensure the performance of that hydrocyclone is not affected by pressure requirement(s) downstream. Accordingly, after each hydrocyclone there is typically an overflow tank into which the overflow is fed. Each overflow tank is often an agitated tank. The water-rich overflow is then pumped from the overflow tank to the next stage of the process. When the overflow is the final water-rich overflow, this next stage is separating the final water-rich overflow, by centrifuging, into a recovered water stream and a low-water residue.

In embodiments with two or more hydrocyclonic separation stages, there may be at least one overflow tank into which the overflow is fed between each stage. In embodiments where there are two or more hydrocyclones in a stage, the hydrocyclones may feed the water-rich overflow into an overflow tank common to all the hydrocyclones of the stage. In some embodiments, two or more hydrocyclones may share an overflow tank. In some embodiments, there may be an overflow tank for each hydrocyclone of the hydrocyclonic separation stage.

The partially dewatered underflow of the, or each, hydrocyclonic separation stage may be up to 80 wt % solids. For example, the solids content may be up to, or exceed, 75 wt %. The partially dewatered underflow may be about 70-80 wt % solids, such as 74-80 wt %. Typically, the solids content will be at least 70 wt %. The solids content of the partially dewatered underflow will depend on the desired solids content of the stackable tailings residue. In addition, the solids content that may be achieved during hydrocyclonic separation will be affected by the particle size distribution (PSD), mineralogy, shape, surface charge and specific gravity of the tailings.

In general, it may be desirable to obtain an underflow with a solids content as high as possible. Accordingly, for the first aspect, it is as desirable to obtain an underflow with a solids content close as possible to the target solids content for the stackable tailings residue. In some embodiments, as noted above, hydrocyclonic separation alone may not adequately dewater the tailings to produce a stackable tailings residue. Accordingly, the method of the invention may utilise centrifuge separation to produce a low-water residue with a lower water content than the target moisture content for the stackable tailings residue.

For the second aspect, it may be desirable to obtain an underflow with a solids content close as possible to the target solids content for the dewatered tailings residue. In certain applications, hydrocyclonic separation alone may not adequately dewater tailings to produce the desired dewatered tailings residue. Alternatively, hydrocyclonic separation alone may not achieve rates of solids recovery that are high enough. That is, hydrocyclonic separation alone may not adequately separate solids from water in the tailings to achieve the desired level of water recovery and the desired level of tailings residue volume. Accordingly, the method of the second aspect of invention may utilise centrifuge separation to produce a low-water residue with a lower water content than the target moisture content for the dewatered tailings residue and a recovered water stream.

The solids content of the partially dewatered underflow from each hydrocyclonic separation stage may be substantially the same or may be materially different. In some embodiments, the solids content of the partially dewatered underflow of the second (and any subsequent) stage may be less than the solids content of the partially dewatered underflow of the first hydrocyclonic separation stage. For example, the partially dewatered underflow of the first hydrocyclonic separation stage may be about 80 wt %, and the partially dewatered underflow of the second (and any subsequent) stage may be about 70 wt %. Typically, the solids content of the partially dewatered underflow of the second (and any subsequent) stage would be lower than the solids content of the partially dewatered underflow of the first stage, as the second (and any subsequent) stage is treating the overflow of the preceding stage which has a higher moisture content than the original tailings. However, in some embodiments the hydrocyclones of the second (and any subsequent) stage may be different to those of the first stage and capable of producing a partially dewatered underflow with a higher solids content. For example, the hydrocyclones of the second (and any subsequent) stage may be smaller and greater in number than the hydrocyclone(s) of the first stage.

It will be appreciated that, even though the partially dewatered underflow from each stage of hydrocyclonic separation may not be dewatered enough to be a stackable tailings residue, the partially dewatered underflow may be highly dewatered. This highly dewatered underflow may be a useful product in its own right. In some embodiments, some or all of one or more of the partially dewatered underflows of one or more stages of hydrocyclonic separation may be collected as a highly dewatered product. Thus, in some embodiments of the first and second aspects, in which there are two or more stages of hydrocyclonic separation, at least some of the one or more partially dewatered underflows of one of the plurality of hydrocyclonic separation stages is collected as a highly dewatered product. In some embodiments, there is provided a system wherein one of the sub-units of the hydrocyclonic separation unit has a product line configured for collecting at least some of the one or more partially dewatered underflows as a highly dewatered product. For example, in some embodiments, at least some of the partially dewatered underflows from the first stage of hydrocyclonic separation may be collected as a highly dewatered product. In some embodiments, the highly dewatered product from the underflow of the first stage of hydrocyclonic separation may have a particle size distribution and solids content that means that it has the characteristics of a stackable tailings residue. That is, in some embodiments, it may be a stackable tailings residue.

As used herein, a "highly dewatered product" includes products with a solids content of at least 72 wt % solids, such as between 78 wt % and 80 wt % solids. In some embodiments, the highly dewatered product may be pumpable.

The water-rich overflow of the, or each, hydrocyclonic separation stage may be up to 17 wt % solids. For example, the water-rich overflow may be about 10-17 wt % solids, such as 14-17 wt %. Typically, the solids content will be at most 17 wt %. While a water-rich overflow with a greater solids content can be separated by centrifuging, typically hydrocyclonic separation will not produce a final water-rich overflow with a solids content above about 17 wt %.

The solids content of the water-rich overflow from each hydrocyclonic separation stage may be substantially the same or may be materially different. In some embodiments, the solids content of the water-rich overflow of the second (and any subsequent) stage, may be less than the solids content of the water-rich overflow of the first hydrocyclonic separation stage. For example, the water-rich overflow of the first hydrocyclonic separation stage may be about 12 wt %, and the water-rich overflow of the second (and any subsequent) stage may be about 7 wt %.

In normal operation, hydrocyclones develop a central air column (air core). The air column is established as soon as the fluid at the hydrocyclone axis reaches a pressure below the atmospheric pressure. This air column extends from the underflow outlet to the overflow outlet and simply connects the air immediately below the hydrocyclone with the air at the top. The stability and cross-sectional area of the air core may be an important factor in influencing the underflow and overflow discharge conditions.

In some embodiments, the stability of hydrocyclone operation can be disrupted by collapse of the air column due to "overfeeding" of the hydrocyclone, resulting in an ineffective separation process, whereby either an excess of fine particulates exit through the lower outlet or coarser particulates exit through the upper outlet. However, for some other embodiments, the development of the internal air column may be irrelevant for dewatering performance. Indeed, in some embodiments, the development of an air column may be undesirable. For some embodiments, it may advantageous to operate the hydrocyclone at much higher feed rate and input pressure than would be typically utilised, as this may result in improvements in dewatering.

In the third aspect of the present invention, there is provided, a method of producing a highly dewatered product, comprising: feeding an aqueous slurry or sludge, said aqueous slurry or sludge comprising particulate solid material, to a hydrocyclone at a high feed inlet pressure; and subjecting the aqueous slurry or sludge to hydrocyclonic separation to produce an underflow and an overflow, said underflow being a highly dewatered product. It will be appreciated that the aqueous slurry or sludge may be tailings or an overflow from a preceding hydrocyclonic separation stage. Alternatively, this dewatering method can be used with other types of aqueous slurries or sludges that are not derived from tailings.

Another form of operation that is typically considered unstable is known as "roping", whereby the rate of solids being discharged through the lower outlet increases to a point where the internal air core collapses and the lower outlet will discharge a rope-shaped flow of coarse solids. However, in some embodiments of the present invention, operating one or more of the hydrocyclones at a high underflow discharge rate may still provide a suitable partially dewatered underflow for use in the production of a stackable tailings residue. Due to the high solids content of the underflow, there may be some sedimentation of solids onto the wall of the hydrocyclone before the underflow is emitted from the spigot, leading to roping.

In some embodiments of the third aspect, the hydrocyclone is configured to produce, in use at a normal pressure, an internal air column and the high feed inlet pressure is such that there is at least partial collapse of the internal air column.

In general, the dewatering performance of the hydrocyclone may improve with increasing feed inlet pressure, even if this pressure is such that the internal air column collapses. The feed inlet pressure for the, or each, hydrocyclone may be up to 1.5 MPa, or more. The feed inlet pressure may be up to 1 MPa, or more. In some embodiments, the feed inlet pressure may be 0.5 MPa or more, for example, the feed inlet pressure may be 0.5-1 MPa.

In some embodiments, the high feed inlet pressure is at least 0.75 MPa, or from about 0.9 MPa to about 1.2 MPa, such as about 1.0 MPa to about 1.1 MPa.

In some embodiments of the present invention, the flow rate of the tailings into the hydrocyclonic separation unit may be adjusted to ensure that the amount of solids fed, per unit time, to at least the first hydrocyclone of the hydrocyclonic separation unit is kept constant. If the density of the tailings increases, the tailings may be adjusted, such as by being diluted with water, before being fed to the hydrocyclonic separation stage so that both the volume inflow and the amount of solids fed into the hydrocyclone per unit time remains constant. That is, the flow rate of the tailings may be reduced, but this can be compensated for by the addition of water to the input stream. If the density of the tailings decreases, the volume inflow may be increased to such an extent that the amount of solids fed into the hydrocyclone per unit time remains constant.

Hydrocyclones can be used for separation by size of the suspended solid particles (e.g. classification) or by particle density. Thus, each of the water-rich overflow and partially dewatered underflow of a stage of the hydrocyclonic separation may have a narrower range of particle sizes or a smaller variance in particle sizes than the input to that stage. Each of the water-rich overflow and partially dewatered underflow of a stage of the hydrocyclonic separation may have different average particle size to that of the input to that stage. The water-rich overflow of a stage of the hydrocyclonic separation may have a smaller (finer) average particle size than the partially dewatered underflow of that stage. Thus, as each stage of the hydrocyclonic separation is completed, water-rich overflows with progressively smaller average particle sizes may be produced. Accordingly, the input to the centrifuge unit may have a smaller average particle size than the input to any of the stages of hydrocyclonic separation.

In some embodiments, the partially dewatered underflow of the first stage may have a coarser average particle size than the tailings. Due to this coarser average particle size, it may be advantageous to collect some or all of the partially dewatered overflow from the first stage as a highly dewatered product. The particle size distribution of the highly dewatered product collected from the first stage may be sufficiently coarse to drain water rapidly causing interparticle bonding. As a result, in some embodiments, the highly dewatered product may be a stackable tailings residue. The highly dewatered product may have a moisture content and particle size distribution making it suitable for use in the construction of tailings storage facility embankments or other retaining structures for dams. In some embodiments, the highly dewatered product may have a particle size distribution such that only 15-20% of particles are less than 75 μm. In some embodiments, the highly dewatered product may meet the requirements of the Chilean Regulations for the Approval of Design, Construction, Operation and Closing Projects of Tailings Deposits (Decreto Supremo N° 248, Reglamento Para La Aprobación De Proyectos De Diseño, Construcción, Operación Y Cierre De Los Depósitos De Relaves, Ministerio De Minería, Publicado En El Diario Oficial El 11 De Abril De 2007) for use in the construction of walls or embankments of tailings storage facilities.

The highly dewatered product may be useful for the production of construction materials. Due to the relatively coarse particle size distribution, in construction material applications, the highly dewatered product may only be need to be combined with low levels of cementitious material to achieve the necessary strength for that application. Thus, the highly dewatered product may be useful for the production of shotcrete, concrete, roadways, construction blocks, and/or bricks.

In addition, by removing a proportion of the coarser fraction of particles by collecting some or all of the partially dewatered underflow from the first stage as a highly dewatered product, the particles in the dewatered tailings residue or stackable tailings residue will be, on average, finer. The finer particle distribution in the dewatered tailings residue or stackable tailings residue may be advantageous for the consolidation of the dewatered tailings residue or stackable tailings residue. As the particles become finer, the surface area to volume ratio increases. Inter-particle attraction may become stronger as the specific surface area of the particles increases at the same solids concentration. With increasing surface area, the capacity of the residue to hold water in the interstices increases, so that there is limited water available for residue fluidity. Accordingly, as the particle size distribution become finer, the residue may become more rigid.

The particle size distribution can affect the degree of dewatering that is required to produce a stackable tailings residue. For example, where the particles in the partially dewatered underflow are relatively coarse, there is a higher mass to surface area ratio and the underflow may be fluent, even at high solids concentrations. For example, in some embodiments, underflows with about 80 wt % solids, such as about 78 wt % solids, and a coarse particle distributions may have sufficient fluidity to be pumpable. On the other hand, an underflow (or a low-water residue from the centrifuge) with about 80 wt % solids, such as about 78 wt % solids, and with a fine particle size distribution may be a stackable tailings residue that it too rigid for pumping. Coarse particle distributions may have a d100 of <1000 μm (e.g. <600 μm) and a d50 of <150 μm (e.g. <100 μm or <70 μm). Fine particle distributions may have a d100 of <100 μm (e.g. <75 μm or <35 μm) and a d50 of <10 μm (e.g. <8 μm or <6 μm).

Thus, in some embodiments, collecting some or all of the partially dewatered overflow from, at least, the first stage as a highly dewatered product may be used to adjust the particle size distribution of the dewatered tailings residue or the stackable tailings residue formed from the process streams. By adjusting the particle size distribution that is used to prepare the dewatered tailings residue or the stackable tailings residue, the residue may have a finer particle size distribution. As a result, in some embodiments, the stackable tailings residue may have a lower solids content than the partially dewatered underflow from the first stage of hydrocyclonic separation, but be more rigid as a result of the finer particle distribution.

In general, as the particle size distribution of a process stream becomes finer, water may separate less readily from the solids so as to produce an underflow or a low-water residue with a very high solids content.

In embodiments where two or more stages of hydrocyclonic separation are used, the first hydrocyclonic separation stage may recover up to 42% or more, e.g. up to 60% or more, such as up to about 75%, of the total solids in the tailings in the partially dewatered underflow. The hydrocyclonic separation of the second (or any subsequent) stage may recover a smaller percentage of the solids from the input into that stage (i.e. the water-rich overflow of the preceding stage). For example, the hydrocyclone of the second (or any subsequent) stage may recover about 10-50% of the solids from the input into that stage. From the final water-rich overflow, the centrifuge may recover up to 96% (or more) of the solids into the low-water residue.

In addition, as described above, in some embodiments, the solids content of the partially dewatered underflow of the second (and any subsequent) stage may be less than the solids content of the partially dewatered underflow of the first hydrocyclonic separation stage.

In some embodiments, gas is injected into one or more of the hydrocyclones. The gas may be used to increase acceleration of the particles. Acceleration of the particles may enhance separation of the particles from the water. In addition or alternatively, without being bound by theory, the gas may create a buffer in the hydrocyclone that enabled better separation.

The admission of gas into the hydrocyclone chamber may reduce either or each of the amount of water and the amount of fine particles which are carried away in the underflow stream, rather than the overflow stream. In addition, the injection of gas into a hydrocyclone may reduce the average particle cut size (d50%) in the overflow stream, as a consequence of more fine particles reporting to the overflow stream. The gas injected may be air.

The injection of gas may be associated with an increase in the solids content of the partially dewatered underflow of up to two (2) weight percentage points. The effect of gas injection on the underflow composition may differ depending on the particle size distribution of the input into the hydrocyclone. When the input has a coarse particle distribution, such as d100 of <600 μm and a d50 of <70 μm, the injection of gas into the coarse input may improve concentration, but not recovery. In contrast, when the input has a fine particle distribution, such as d100 of <35 μm and a d50 of <6 μm, the injection of gas into the fine input may improve recovery, but not solids concentration. That is, more of the total solids will be recovered, but more water will also be transported into the underflow. The injection of gas may be associated with an increase in the recovery of solids into the partially dewatered underflow of up to ten (10) percentage points. In some cases, the increase in recovery may be associated with a decrease in solids concentration. Accordingly, the level of gas injection may need to be adjusted in accordance with the composition of the input so as to deliver preferred levels of recovery, as well as solids concentration, in the underflow.

In some embodiments, gas is injected into the tailings so that a tailings and gas mixture is fed to the hydrocyclone. For example, the tailings stream may be transported along a line including a gas injection nozzle. In some embodiments, air is injected prior to the hydrocyclone entrance flange. Suitable gas injection nozzles may be an air ring. For example, the gas injection nozzle may be an air ring of the type typically used in shotcreting applications. In some embodiments, air is injected using an air ring around the periphery of the delivery pipe with a plurality of orifices through the pipe wall. The gas may be injected immediately before the tailings and gas mixture is fed into the hydrocyclone. In other embodiments, the gas may be injected further upstream from the hydrocyclonic separation.

In some embodiments, the gas may be directed injected into the chamber of the hydrocyclone.

A suitable hydrocyclone for use in embodiments where gas is injected into the chamber of the hydrocyclone may be the hydrocyclone described in International Patent Application No. PCT/AU2017/050950 (published as International Patent Publication No. WO 2018/039742), the contents of which are incorporated by reference.

The gas will typically be injected at a pressure greater than the feed inlet pressure. In some embodiments, up to 60 $m^3$/hr of gas may be injected into the hydrocyclone, such as up to up to 48 $m^3$/hr, up to 30 $m^3$/hr, over 18 $m^3$/hr, over 15 $m^3$/hr or over 10 $m^3$/hr. For example, in the third aspect of the invention, the method may comprise injecting gas into the aqueous slurry or sludge, before the aqueous slurry or sludge is fed to the hydrocyclone, at a pressure higher than the high feed inlet pressure. Injecting gas may comprises injecting over 18 $m^3$/hr of gas into the aqueous slurry or sludge. Injecting gas comprises injecting up to 30 $m^3$/hr, such as up to 60 $m^3$/hr, of gas into the aqueous slurry or sludge.

In some embodiments, a coagulant and/or flocculant may be injected into hydrocyclone. In some embodiments, the tailings may be mixed with a coagulant and/or flocculant before being fed to the hydrocyclone. The coagulant and/or flocculant may promote agglomeration of particles of the solids and facilitate separation of solids from the water, thus increasing the concentration of solids carried into the partially dewatered underflow stream.

In embodiments where gas injection is used together with coagulant and/or flocculation, the coagulant and/or flocculant may be mixed with the tailings at the same time or before the gas is injected. For example, the coagulant and/or flocculant may be injected into the tailings stream at the same time as the gas is injected into the tailings stream. In some other embodiments, it may be desirable to mix the tailings with a coagulant and/or flocculant first to allow flocs or coagulated aggregations to form before the gas is injected.

In some embodiments, a surfactant may be injected into hydrocyclone. The surfactant may be an anionic, cationic or non-ionic surfactant. In some embodiments, the tailings (or the overflow of a preceding hydrocyclonic separation stage) may be mixed with a surfactant before being fed to the hydrocyclone. The surfactant may be used in conjunction with the coagulant and/or flocculant. In some embodiments, the surfactant may be added before the coagulant and/or flocculant. In some embodiments, there may be co-addition of the surfactant and the coagulant and/or flocculant. Without being bound by theory, the surfactant may be useful for pre-wetting the surface of the dispersed particles in the tailings (or the overflow of a preceding hydrocyclonic separation stage) or to induce a charge on the particle surface, thereby permitting the particles to be attracted by the flocculant and/or coagulant. Alternatively or additionally, without being bound by theory, the surfactant may aid in dispersing the flocculant and/or coagulant in the tailings (or the overflow of a preceding hydrocyclonic separation stage). The coagulant and/or flocculant is then more readily able to induce coagulation, aggregation or flocculation.

After the hydrocyclonic separation stage, the final water-rich overflow is separated, by centrifuging, into a recovered water stream and a low-water residue. In some embodiments, the low-water residue may be a pulp.

In the system of present invention, the centrifuge unit comprises at least one centrifuge. Where there are two or more centrifuges in the unit, the centrifuges can be connected in parallel. For example, two or more centrifuges may be connected in parallel to achieve the desired volumetric throughput for the system.

Typically, the types of centrifuges that are useful in embodiments of the present invention are solid bowl centrifuges. If a solid bowl centrifuge is used, it may be a conical, cylindrical, or cylindrical-conical solid bowl centrifuge. If a solid bowl centrifuge is used, it may be a vertical or a horizontal solid bowl centrifuge. In some embodiments, the centrifuge unit may include a combination of two or more different types of centrifuge.

Generally, in a solid bowl centrifuge, final water-rich overflow is introduced into the feed chamber assembly along the longitudinal axis of the centrifuge. The water-rich overflow is discharged from the feed chamber assembly into the bowl. As the final water-rich overflow contacts the rotating wall of the bowl and reaches maximum speed, the centrifugal forces cause solids to settle out of the overflow and separate from the liquid (primarily water) of the final water-rich overflow.

The point along the centrifuge at which water-rich overflow is output from the feed chamber assembly and into the bowl can be selected to provide the desired centrifugal separation. In addition, the length of bowl, taper angle of any cone and/or discharge diameter may be selected based upon the desired separation performance so as to provide a centrifuge that is suitably configured for use in the present invention.

The solids that build up on the inner wall of the bowl may be conveyed to one end of the centrifuge by a scroll, which turns at a different speed than the bowl. The solids are ultimately conveyed out of the pond of the centrifuge that also includes the liquid (primarily water) separated from the water-rich overflow, prior to being discharged from the bowl as the low-water residue. The section of the centrifuge along which the solids are conveyed by the scroll outside of the pond may be referred to as the drying section of the centrifuge.

The centrifugal force exerted on the solids can compress them to release water and produce the desired solids content in the low-water residue. The liquid discharged from the centrifuge is the recovered water stream. Typically, the recovered water stream will be discharged at the opposite end of the centrifuge to the low-water residue.

In some embodiments, the recovered water stream will have 1 wt % solids or less. The solids content of the recovered water stream (i.e. the clarity of the recovered water stream), as well as the solids content of the low-water residue, will be influenced by rotational speed of the centrifuge and consequent centrifugal force generated. The faster the bowl turns, the greater the centrifugal force, and the greater the compaction of the solids to remove liquid from them, thus improving the separation of solids from the liquid to dewater the solids from the final water-rich overflow.

In addition, the pond depth may also affect the clarity of recovered water stream and the solids content of the low-water residue. As the pond depth increases, the liquid volume and thus the residence time spent by the liquid in the centrifuge may increase. This may improve the clarification of the recovered water stream. However, with increases in pond depth, the size of the drying section of the bowl may be reduced. As a result, the solids spend less time outside of the pond. This may result in a reduction in dewatering performance and an increase in the moisture content of the low-water residue.

In some embodiments, the centrifuge includes weir discs or weir plates which can be adjusted to select the pond depth of the centrifuge. In some embodiments, the weir discs or weir plates may be adjusted to minimise the pond depth and maximise the drying section of the centrifuge.

The clarity of the recovered water stream may be such that it can be directly reused in the process that generated the tailings, without requiring any further clarification, filtering or purification.

The difference between the rotation speed of the bowl and the scroll may influence the solids content of the low-water residue. As the speed of the scroll is reduced, relative to the speed of the bowl, the solids content of the low-water residue may increase as increases in residence time may maximize compaction of the solids within the centrifuge.

The configuration of the scroll may also influence the solids content of the low-water residue. Scroll pitch is the distance between the scroll blades of a helical turn, i.e. the advance movement performed by the scroll during one rotation. Accordingly, scroll pitch influences how the solids are conveyed by the scroll and the residence time in the centrifuge for a set rotational speed of the scroll. Thus, reductions in scroll pitch can increase the residence time in the centrifuge. Increases in residence time can increase the amount of liquid separated from the solids. Accordingly, as scroll pitch decreases, the solids content of the low-water residue may increase.

The feed rate, in particular the amount of solids fed per unit time, may also have an effect on the solids content of the low-water residue. As the amount of solids fed per unit time increases, it may become necessary to increase the speed of the scroll so as to remove the solids from the bowl at a suitable rate. This can reduce the residence time of the solids in the bowl and consequently reduce the amount of liquid separated from the solids. Accordingly, as the amount of solids fed per unit time increases, the solids content of the low-water residue may decrease.

The initial hydrocyclonic separation separates some of the solids from the tailings into the partially dewatered underflows. By doing so, initial hydrocyclonic separation reduces the amount of solids that are fed to the centrifuge. The reduced amount of solids into the centrifuge unit may enable the centrifuge to operate at a high dewatering efficiency by allowing a desirable feed rate of solids to be used. In some embodiments, the amount of solids fed to the centrifuge is limited to less than 50% of the total solids from the tailings. Preferably, the solids fed to the centrifuge is limited to less than 20% of the total solids from the tailings.

In some embodiments of the present invention, the flow rate of the final water-rich overflow into the centrifuge unit may be adjusted to ensure that the amount of solids fed, per unit time, is kept constant. If the solids content of the final water-rich overflow increases, the volume inflow may be reduced to such an extent that the amount of solids fed into the centrifuge unit, per unit time, remains constant and vice versa.

It will be appreciated that the method of the present invention is often performed continuously. Thus, the feed rate of the final water-rich overflow into the centrifuge may be determined by the rate at which the final water-rich overflow is output by the final hydrocyclonic separation stage. The operation of the hydrocyclonic separation depends on the feed rate of the tailings and the operating parameters of the hydrocyclones. Accordingly, the input of tailings and the operation of the hydrocyclonic separation, as well as the operation of the centrifuge, may be adjusted so that a stackable tailings residue (in the first aspect of the invention) (a dewatered tailings residue in the second aspect of the invention) can be produced continuously.

In some embodiments, a flocculant and/or coagulant may be injected into the centrifuge. The flocculant and/or coagulant may promote agglomeration of particles of the solids and facilitate separation of solids from the water in the water-rich overflow, thus increasing the concentration of solids in the low-water residue. The use of a flocculant and/or coagulant may be particularly desirable when it is desirable to maximise recovery of solids into the low-water residue and maximise clarity of the recovered water stream. In some embodiments, it is preferred to use a flocculant. For example, in some embodiments, the solids content without a flocculant the recovered water stream may have a solids content of up to 8 wt %, and with a flocculant the recovered water stream may have a solids content of less than 0.5 wt %.

In some embodiments, a surfactant may be injected into centrifuge. The surfactant may be an anionic, cationic or non-ionic surfactant. In some embodiments, the water-rich overflow of the final stage of hydrocyclonic separation may be mixed with a surfactant before being fed to the centrifuge. The surfactant may be used in conjunction with the coagulant and/or flocculant. In some embodiments, the surfactant may be added before the coagulant and/or flocculant. In some embodiments, there may be co-addition of the surfactant and the coagulant and/or flocculant. Without being bound by theory, the surfactant may be useful for pre-wetting the surface of the dispersed particles in the water-rich overflow or to induce a charge on the particle surface, thereby permitting the particles to be attracted by the flocculant and/or coagulant. Alternatively or additionally, without being bound by theory, the surfactant may aid in dispersing the flocculant and/or coagulant in the water-rich overflow. The coagulant and/or flocculant is then more readily able to induce coagulation, aggregation or flocculation.

As noted above, the low-water residue may have a lower moisture content than the, or each, partially dewatered underflow from the hydrocyclonic separation. Accordingly, the low-water residue may have a lower water content than the target moisture content for the stackable tailings residue (in the first aspect of the invention) (the dewatered tailings residue in the second aspect of the invention). In some embodiments, the low-water residue may be up to 90 wt %, such as up to 85 wt % solids. For example, the low-water residue may be about 80-85 wt % solids. For example, the solids content will be at least 80 wt %.

Furthermore, as noted above, the water-rich overflow sent to centrifuge may have a finer particle distribution than the original tailings. As the particle size distribution becomes finer, water may be separated less readily from the water-rich overflow so that it may become more difficult to produce a low-water residue with about 80-90 wt % solids. However, in addition, as the particle size distribution becomes finer, the low-water residue may become more rigid despite having a higher water content. For example, in some embodiments, the low-water residue may be only 60 wt %, or about 60 wt % to about 80 wt %, such as about 65 wt %, or about 74 wt %. In such embodiments, the low-water residue may have the characteristics of a stackable tailings residue due to the fine particle size distribution.

In the method of the present invention, the low-water residue and at least part of the one or more partially dewatered underflows are mixed together to produce a stackable tailings residue (in the first aspect of the invention) (a dewatered tailings residue in the second aspect of the invention). Thus, the system of the present invention includes a suitable mixer for mixing together the low-water residue and at least part of the one or more partially dewatered underflows to produce a stackable tailings residue (in the first aspect of the invention) (a dewatered tailings residue in the second aspect of the invention). Mixers that may be suitable for embodiments of the present invention may be a single- or twin-shaft horizontal mixer, or a vertical-shaft agitator mixer.

The partially dewatered underflow(s) and the low-water residue may be conveyed to the mixer by suitable pump arrangements, such as a positive displacement pump. Alternatively, the hydrocyclone(s) and the centrifuge(s) are configured so that the partially dewatered underflow(s) and the low-water residue can fall into the mixer. In some embodiments, as the partially dewatered underflow(s) typically have a higher moisture content that the low-water residue, the partially dewatered underflow(s) are conveyed to the mixer by a suitable pump arrangement and the centrifuge and the mixer are configured so that the low-water residue falls from the centrifuge into the mixer.

In the first aspect of the invention, the partially dewatered underflow(s) and the low-water residue will be mixed together at appropriate ratios to ensure that the resulting tailings residue is stackable. In some embodiments, the partially dewatered underflow(s) may be up to 85% of the stackable tailings residue, such as about 80%. For example, in some embodiments, the partially dewatered underflow(s) may be about 70% of the stackable tailings residue or about 65% of the stackable tailings residue. Accordingly, in some embodiments, the low-water residue may be about 35% or 30% of the stackable tailings residue. In some embodiments, the low-water residue may be about 15-20% of the stackable tailings residue.

Similarly, in the second aspect of the invention, the partially dewatered underflow(s) and the low-water residue will be mixed together at appropriate ratios to ensure that the resulting tailings residue is has the desired solids concentration. In some embodiments, the partially dewatered underflow(s) may be up to 85% of the dewatered tailings residue, such as about 80%. For example, in some embodiments, the partially dewatered underflow(s) may be about 70% of the dewatered tailings residue or about 65% of the dewatered tailings residue. Accordingly, in some embodiments, the low-water residue may be about 35% or 30% of the dewatered tailings residue. In some embodiments, the low-water residue may be about 15-20% of the dewatered tailings residue.

In some embodiments of either the first or second aspect, in which there are two stages of hydrocyclonic separation, about 60% of the total solids may be recovered in the partially dewatered underflow from the first stage, about 10% to about 20% of the total original solids may be recovered in the partially dewatered underflow of the second stage, and about 20% to about 30% of the total original solids may be recovered in the low-water residue from the centrifuge. In some embodiments, about 60% of the total solids may be recovered in the partially dewatered underflow from the first stage, greater than about 20% of the total original solids may be recovered in the partially dewatered underflow of the second stage, and less than about 20% of the total original solids may be recovered in the low-water residue from the centrifuge.

In embodiments where some at least some of the one or more partially dewatered underflows of one of the plurality of hydrocyclonic separation stages is collected as a highly dewatered product, the remainder of the partially dewatered underflows may be a greater proportion of the stackable tailings residue, or dewatered tailings residue, than the low-water residue. In some other embodiments where some at least some of the one or more partially dewatered underflows of one of the plurality of hydrocyclonic separation stages is collected as a highly dewatered product, the low-water residue may be a greater proportion of the stackable tailings residue, or dewatered tailings residue, prepared from the remainder of the partially dewatered underflows and the low-water residue. For example, the low-water residue may be up to 80% of the stackable tailings residue or dewatered tailings residue.

In some embodiments, the partially dewatered underflow the first hydrocyclonic separation stages is collected as a highly dewatered product. In some of those embodiments, about 48% of the total solids may be recovered in the partially dewatered underflow from the first stage (which is then collected as the highly dewatered product), about 10% to about 32% of the total original solids may be recovered in the partially dewatered underflow of the second stage, and about 20% to about 42% of the total original solids may be recovered in the low-water residue from the centrifuge. In some embodiments, about 48% of the total solids may be recovered in the partially dewatered underflow from the first stage, greater than about 32% of the total original solids may be recovered in the partially dewatered underflow of the second stage, and less than about 20% of the total original solids may be recovered in the low-water residue from the centrifuge.

The feed rate of the tailings into the system of the present invention, as well as the operation of the hydrocyclonic separation unit and the centrifuge unit, may be adjusted so as to continuously provide the partially dewatered underflow(s) and the low-water residue to the mixer in the appropriate ratio for preparing a stackable tailings residue (in the first aspect of the invention) (a dewatered tailings residue in the second aspect of the invention).

FIG. 1 is a schematic of an embodiment of a system in accordance with the invention. In this embodiment, the tailings stream 13 is fed to the hydrocyclonic separation unit 10 and separated into a partially dewatered underflow 14 and a final water-rich overflow 15. The final water-rich overflow 15 is fed to a centrifuge unit 16 and separated into a recovered water stream 22 and a low-water residue 17. The recovered water stream 22 may be directed along a line back to the mining operation, which generated the tailings, for reuse.

The low-water residue 17 and the partially dewatered underflow 14 are mixed together in the mixer 18 to produce a stackable tailings residue. In this embodiment, the stackable tailings residue is then pumped using a pump 19 as a stackable tailings residue stream 20 to the tailings storage facility 21, such as a stacking facility.

The stackable tailings residue may be auger fed from the mixer to the pump.

It may be advantageous to pump the stackable tailings residue (in the first aspect of the invention) (a dewatered tailings residue in the second aspect of the invention) to a disposal site, such as a tailings storage facility. Thus, the present invention provides a method of disposing tailings, comprising: producing, from tailings, a stackable tailings residue in accordance with the method of the first aspect of the present invention; and pumping the stackable tailings residue to a disposal site. Also provided is a system for disposing tailings, comprising: a system for producing, from tailings, a stackable tailings residue in accordance with the system of the present invention; and a pump fluidly connected to a disposal site and configured for pumping the stackable tailings residue to the disposal site. Similarly, the present invention provides in the second aspect, a method and system for disposing tailings, where the product disposed is the dewatered tailings residue instead of the stackable tailings residue. Essentially the same method and system as the first aspect may be used, but where the operating conditions are adjusted so as to produce a dewatered tailings residue instead of a stackable tailings residue. It will be appreciated that dewatered tailings residues may be more fluent than the stackable tailings residue and, accordingly, more pumpable.

Pumping may reduce the rehandling of the stackable tailing residue by earth moving equipment to construct a stable stack. For example, the stackable tailings residue can be pumped to the location where it is to be deposited in the tailings storage facility. This can simplify transport of the stackable tailings residue, which are conventionally trucked or transported by conveyors to the tailings storage facility. Reductions in rehandling of the stackable tailings residue by pumping it to the desired location may simplify maintenance and management of the tailings storage facility. This may have associated benefits for operational expenditure in connection with the tailings storage facility.

A suitable pump for pumping the stackable tailings residue may be a positive displacement pump. In some embodiments, a suitable pump may be a piston pump system that is auger fed.

The piping used to connect the pump to the tailings storage facility may be at least 100 nominal bore (100 NB) piping to reduce pressure gradients and increase flow capacity. In some embodiments, 150 nominal bore (150 NB) piping may be used. In some embodiments, 250-500 nominal bore (250 NB to 500 NB) piping may be used. The size of the pipe selected can be based upon the desired flow rate and friction losses.

A method of assessing how a stackable tailings residue may be pumped is to measure the yield stress of the stackable tailings residue by bench scale rheometry or preferably pipe-loop test work.

In some embodiments, one or more additives may be added to the stackable tailings residue. For example, viscosity modifiers may be added to the stackable tailings residue so that the residue may be more pumpable. Suitable viscosity modifiers may comprise lignosulphonates, such as salts of lignosulphonic acid, melamine, and/or polyamines. In some embodiments, the addition of a lignosulphonate to the stackable tailings residue may reduce the yield stress of the stackable tailings residue by up to 62%, for example, about 35-50%, such as about 40%.

The amount of additive added to the stackable tailings residue can depend upon the identity of the additive. In embodiments where the additive is a viscosity modifier, the amount added to the stackable tailings residue may be 0.05-0.25% (w/w).

An additive may be mixed with the partially dewatered underflow(s) and the low-water residue as they are mixed together to produce the stackable tailings residue. In some embodiments, an additive may be mixed with the low-water residue or a partially dewatered underflow, before the partially dewatered underflow(s) and the low-water residue are mixed together. In some embodiments, an additive may be mixed with the stackable tailings residue as a separate step after the stackable tailings residue has been formed.

The stackable tailings residue of the present invention may have characteristics that are advantageous for pumping. Without being bound by theory, it is believed that the method in accordance with the present invention dewaters the tailings such that a hydrating layer is better maintained on the surface of the particles in the residue. This hydrating layer is believed to lead to the stackable tailings residue of the present invention being more pumpable than a residue prepared using other methods.

Without being bound by theory, it is believed that the hydrating layer of the particles enhances the mobility of the particles within the residue. It is also believed that the stackable tailings residue flowing through the pipe has a non-uniform velocity profile, due to friction effects at the wall of the pipe. Accordingly, there is an increase in the velocity towards the centre of the pipe and this velocity profile is believed to lead to larger particles migrating to the centre of the flow of material through the pipe. It is believed that there is a corresponding migration of finer particles towards the region closest to the wall of the pipe, so that there is a greater proportion of finer particles in the region closest to the wall of the pipe. There is believed to be lower friction between the wall of the pipe and the finer particles so, after a transition period at the commencement of pumping, the stackable tailings residue may become more pumpable. In some embodiments, the stackable tailings residue may be a fluid product. Without being bound by theory, it is believe that alternative processes, such as those using filtration, force particles together such that the hydrating layer is driven off, leading to greater mechanical interlocking of the particles through packing and particle-particle friction.

Furthermore, without being bound by theory, it is believe that the presence of the hydrating layer may enable the stackable tailings residue to have improved consolidation after deposition at a disposal site. Following deposition of the stackable tailings residue at the disposal site, there may be some desiccation of the stackable tailings residue following exposure to the atmosphere at the disposal site. Without being bound by theory, it is believed that, as water evaporates from the stackable tailings residue, the capillary action of the remaining water between the particles draws the particles together.

Pumping the stackable tailings residue through piping to the disposal site may provide a stackable tailings residue with desirable surface characteristics. As noted above, without being bound by theory, it is believed that the stackable tailings residue flowing through the pipe has a non-uniform velocity profile, due to friction effects at the wall of the pipe, leading to a migration of finer particles towards the region closest to the wall of the pipe, so that there is a greater proportion of finer particles in the region closest to the wall of the pipe. As a consequence, when the stackable tailings residue is output from the piping, the outer surface of the stackable tailings material will have a greater proportion of finer particles.

As noted above, it is believed that, as water evaporates from the stackable tailings residue, the capillary action of the remaining water between the particles draws the particles together. As the particles at the surface of the stackable tailings residue may be finer following pumping, the particles may pack together more efficiently as they are drawn together, resulting in a surface with enhanced consolidation. That is, the surface of the disposed stackable tailings residue may be very competent, in that it is resistant to either or each of erosion or deformation. For example, this surface may be more resistant to the eroding effects of wind and/or other environmental factors than a stackable tailings residue deposited by other means.

In general, as the particle size distribution of the stackable tailings residue becomes finer, the particles may pack together more efficiently as they are drawn together during drying, resulting in a surface with enhanced consolidation. That is, the stackable tailings residue may have the advantages noted above in that the surface may be very competent and may be more resistant to the eroding effects of wind and/or other environmental factors than a stackable tailings residue deposited by other means.

Figure 2:
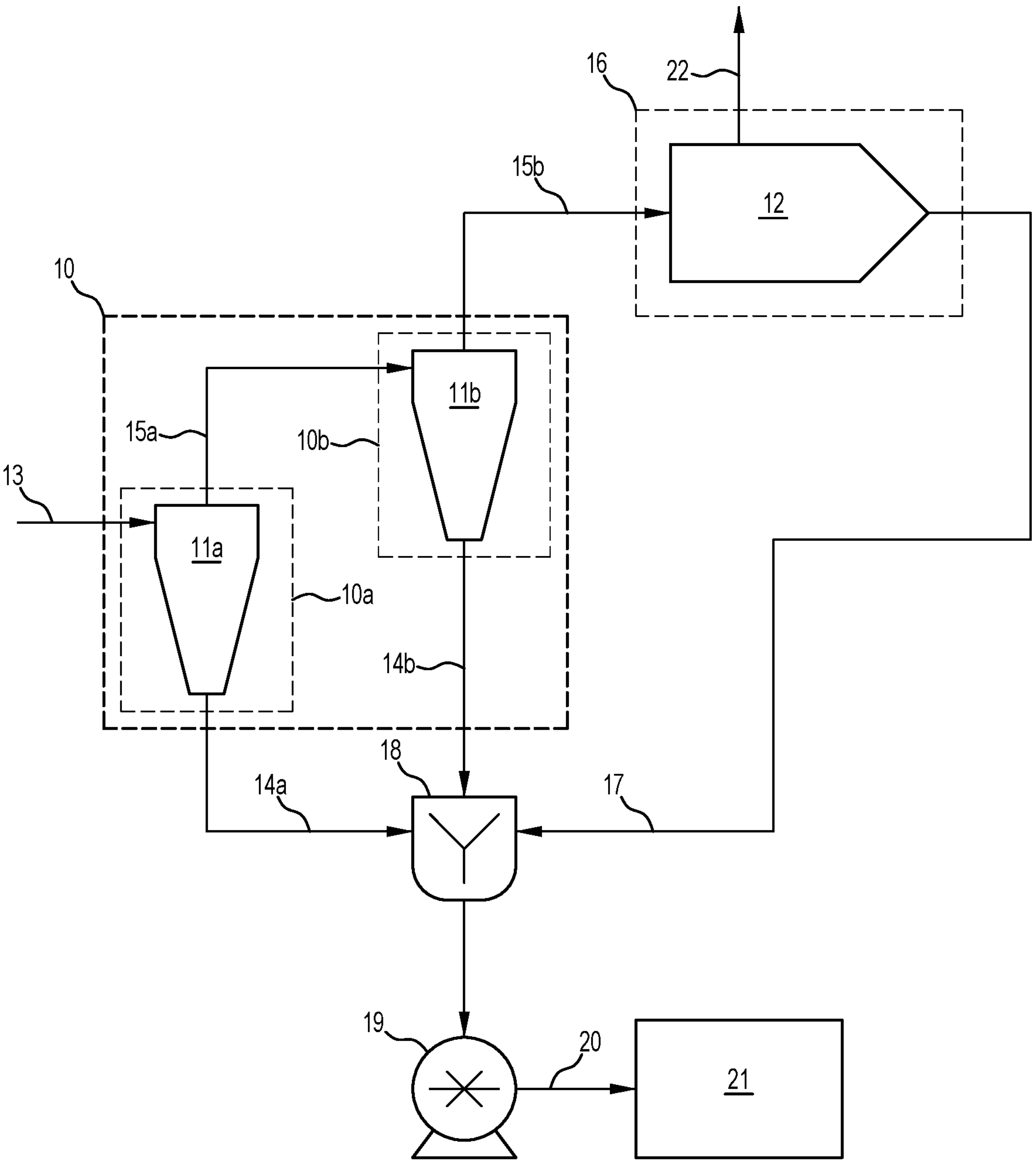
FIG. 2 is schematic illustration of a system in accordance with a second embodiment.

FIG. 2 shows a second embodiment of a system in accordance with the present invention. In this embodiment, the hydrocyclonic separation unit 10 includes two sub-units 10*a*, 10*b* each comprising a hydrocyclone 11*a*, 11*b*.

The tailings stream 13 is fed to the first hydrocyclone 11*a* and separated into a partially dewatered underflow 14*a* and a water-rich overflow 15*a*. The water-rich overflow 15*a* is then fed to the hydrocyclone 11*b* of the next sub-unit 10*b*. In this hydrocyclone 11*b*, the water-rich overflow 15*a* is separated into a partially dewatered underflow 14*b* and a water-rich overflow 15*b*.

As the second hydrocyclone 11*b* is the final hydrocyclonic separation stage of this embodiment, the water-rich overflow 15*b* is fed to a centrifuge 12, such a solid bowl centrifuge, of the centrifuge unit 16 and separated into a recovered water stream 22 and a low-water residue 17. The recovered water stream 22 may be directed, along a line, back to the mining operation that generated the tailings for reuse.

The low-water residue 17 and the partially dewatered underflow 14*a*, 14*b* of each hydrocyclonic separation stage are mixed together with a mixer 18 to produce a stackable tailings residue. The stackable tailings residue is then pumped using a positive displacement pump 19 as a stackable tailings residue stream 20 to the tailings storage facility 21.

By way of further illustrating the production of the stackable tailings residue, if:

- the partially dewatered underflow 14*a* of the first hydrocyclone 11*a* has a solids content of 75-80 wt % and accounts for 65% of the stackable tailings residue;
- the partially dewatered underflow 14*b* of the second hydrocyclone 11*b* has a solids content of 75 wt % and accounts for 15-20% of the stackable tailings residue; and
- the low-water residue 17 from the centrifuge 12 has a solids content of 85-90 wt % and accounts for 15-20% of the stackable tailings residue;

the stackable tailings residue would have a solids content of 75.75-81.25 wt %.

As noted above, hydrocyclonic separation alone may not adequately dewater the tailings to produce a stackable tailings residue. Accordingly, the method of the invention may utilise centrifuge separation to producing a low-water residue with a lower water content than the target moisture content for the stackable tailings residue. The low-water residue can then be combined with the, or each, partially dewatered underflow from the hydrocyclonic separation to produce the stackable tailings residue with the desired solids content.

Figure 3:
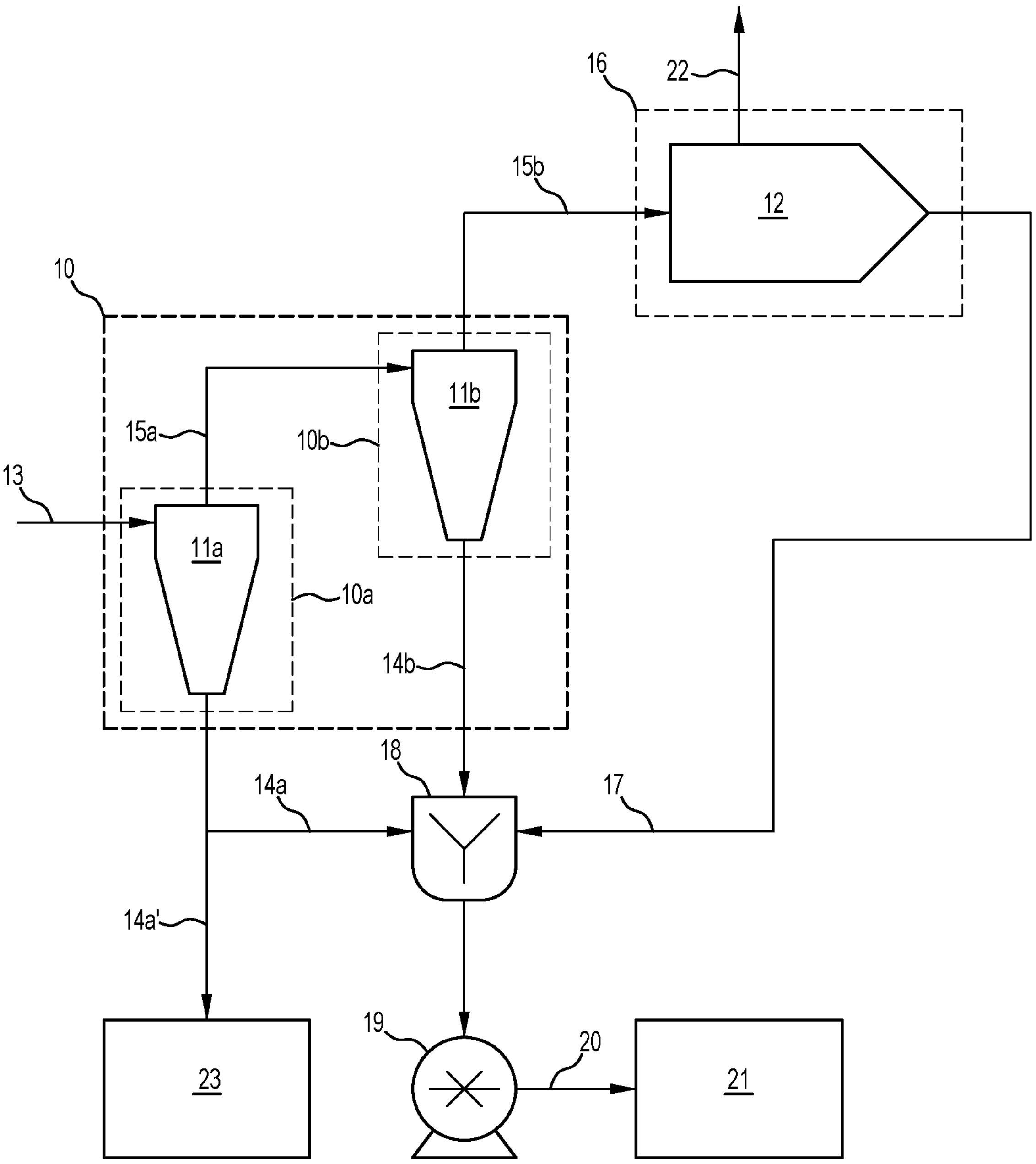
FIG. 3 is schematic illustration of a system in accordance with a third embodiment.

FIG. 3 shows a third embodiment of a system in accordance with the present invention. In this embodiment, the hydrocyclonic separation unit 10 includes two sub-units 10*a*, 10*b* each comprising a hydrocyclone 11*a*, 11*b*.

Figure 4:
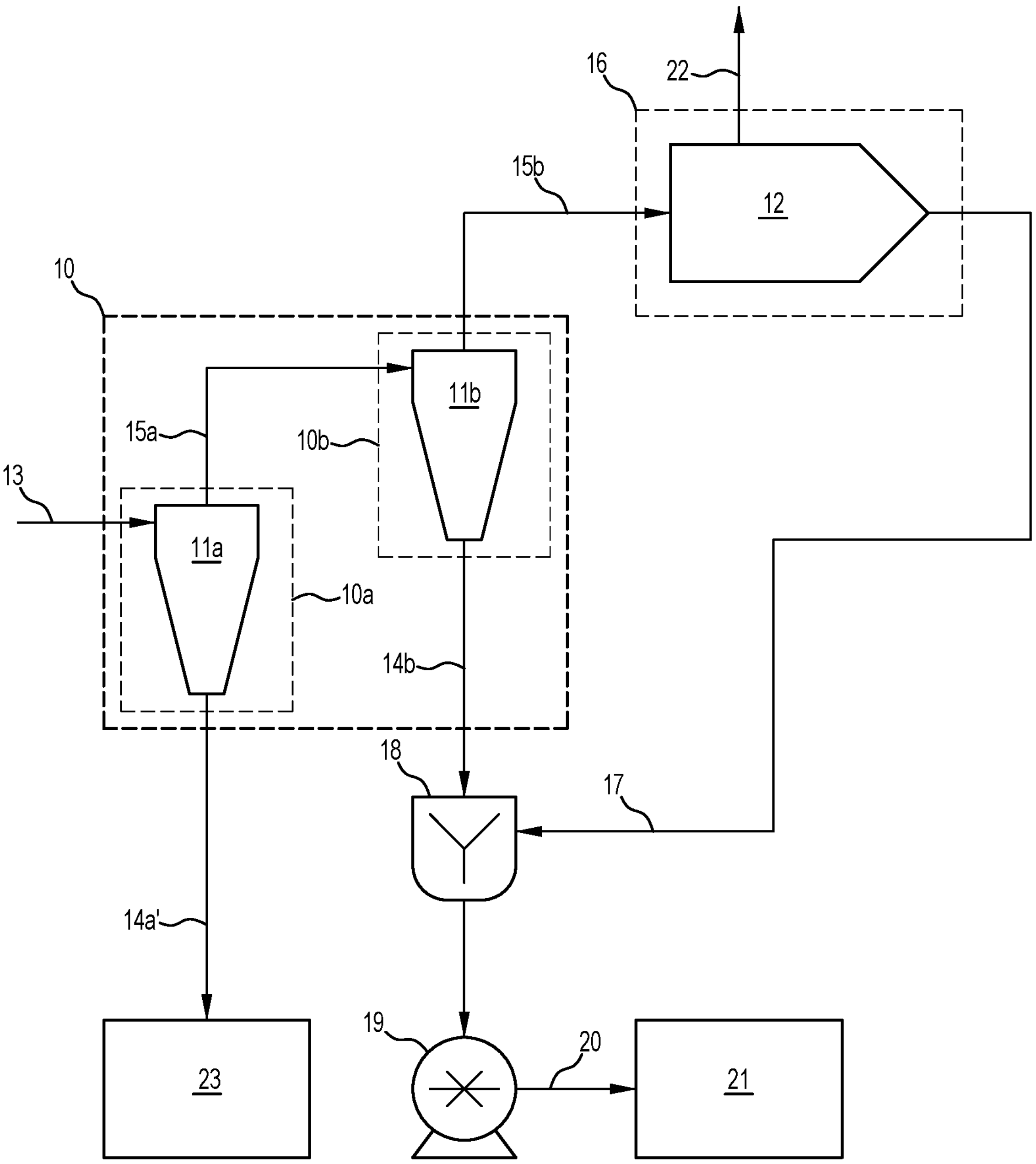
FIG. 4 is schematic illustration of a system in accordance with a fourth embodiment.

The tailings stream 13 is fed to the first hydrocyclone 11*a* and separated into a partially dewatered underflow 14*a* and a water-rich overflow 15*a*. Part of the partially dewatered underflow 14*a* may be collected as a highly dewatered product 14*a*'. This highly dewatered product 14*a*' may be may be useful for the production of a tailings storage facility embankment 23. The amount of partially dewatered underflow 14*a* collected as a highly dewatered product 14*a*' may be adjusted in use depending on process demand. In a fourth embodiment illustrated by FIG. 4, all of the underflow from the first hydrocyclone 11*a* is collected as a highly dewatered product 14*a*', rather than being combined with the other process streams.

The water-rich overflow 15*a* is then fed to the hydrocyclone 11*b* of the next sub-unit 10*b*. In this hydrocyclone 11*b*, the water-rich overflow 15*a* is separated into a partially dewatered underflow 14*b* and a water-rich overflow 15*b*.

As the second hydrocyclone 11*b* is the final hydrocyclonic separation stage of this embodiment, the water-rich overflow 15*b* is fed to a centrifuge 12, such a solid bowl centrifuge, of the centrifuge unit 16 and separated into a recovered water stream 22 and a low-water residue 17. The recovered water stream 22 may be directed, along a line, back to the mining operation that generated the tailings for reuse.

The low-water residue 17 and the remainder of partially dewatered underflow 14*a*, 14*b* of each hydrocyclonic separation stage (i.e. the part not collected as a highly dewatered product 14*a*') are mixed together with a mixer 18 to produce a stackable tailings residue. In the fourth embodiment shown in FIG. 4, the low-water residue 17 and partially dewatered underflow 14*b* of the final hydrocyclonic separation are mixed together with a mixer 18 to produce a stackable tailings residue. The stackable tailings residue is then pumped using a positive displacement pump 19 as a stackable tailings residue stream 20 to the tailings storage facility 21.

The stackable tailings facility 21 may surrounded by embankments 23 formed using the highly dewatered product 14*a*'.

In other embodiments, the operation of the second hydrocyclone 11*b* and the centrifuge 12 may be adjusted so that a more fluent product than a stackable tailings residue is produced. In such embodiments, the water content of the residue will be higher than that of a stackable tailings residue. This more fluent product may be more readily pumpable, so that it may be readily disposed in a tailings dam, such as a tailings storage facility surrounded by embankments 23 formed using the highly dewatered product 14*a*'.

Embodiments in which a fluent product is produced instead of a stackable tailings residue may still be advantageous. In such embodiments, there may still be recovery of water from the tailings. The product disposed of in the tailings storage facility may have a higher solids content than the raw tailings. Accordingly, the volume of tailings residue to be stored may be reduced compared to the raw tailings.

Example 1

An example of the present invention is described with reference to FIG. 5. In this example, a flow of tailings 13 with the properties shown in Table 1 is fed to a first agitation tank 24.

TABLE 1

| Tailings 13 Properties<br>Property | |
|---|---|
| Solids (t/h) | 50 |
| Water (t/h) | 93 |
| Slurry ($m^3$/hr) | 111 |
| Solids Concentration (% w/w) | 35 |
| Relative Density (g/$cm^3$) | 1.283 |

The typical mineral composition of the tailings 13 is shown in Table 2 below.

TABLE 2

| Tailings 13 Mineral Composition | |
|---|---|
| Mineral | Normalized Distribution Total |
| Chalcopyrite | 0.14 |
| Bornite | 0.02 |
| Chalcocite | 0.00 |
| Covellite | 0.00 |
| Tennantite/Enargite | 0.01 |
| Cuprite/Native Copper | 0.00 |
| Pyrite | 0.49 |
| Iron Oxides | 1.18 |
| Quartz | 19.4 |
| Feldspars | 50.0 |
| Chlorite | 11.1 |
| Muscovite | 4.85 |
| Pyroxene/Amphibole | 1.00 |
| Epidote | 1.39 |
| Calcite | 3.56 |
| Biotite/Phlogopite | 3.41 |
| Sphene (Titanite) | 1.52 |
| Apatite | 0.85 |
| Ankerite | 0.34 |
| Kaolinite | 0.24 |
| Fluorite | 0.06 |
| Others | 0.43 |
| Total | 100 |

The tailings 13 are pumped using pump $P_1$ to the first hydrocyclonic separation sub-unit 10*a* comprising at least on Cavex® 150CVX hydrocyclone. In the first hydrocyclonic separation sub-unit 10*a*, the tailings 13 are separated into a partially dewatered underflow 14*a* and a water-rich overflow 15*a*.

The feed inlet pressure is about 1000-1100 kPa, and the solids recovery to the partially dewatered underflow 14*a* is 60%. The properties of the partially dewatered underflow 14*a* are shown in Table 3 below.

TABLE 3

| Partially Dewatered Underflow 14a Properties Property | |
|---|---|
| Solids (t/h) | 30 |
| Water (t/h) | 8 |
| Slurry ($m^3$/hr) | 19 |
| Solids Concentration (% w/w) | 80 |
| Relative Density (g/$cm^3$) | 2.019 |

The properties of the water-rich overflow 15*a* are shown in Table 4 below.

TABLE 4

| Water-Rich Overflow 15a Properties Property | |
|---|---|
| Solids (t/h) | 20 |
| Water (t/h) | 85 |
| Slurry ($m^3$/hr) | 93 |
| Solids Concentration (% w/w) | 19 |
| Relative Density (g/$cm^3$) | 1.136 |

Figure 6:
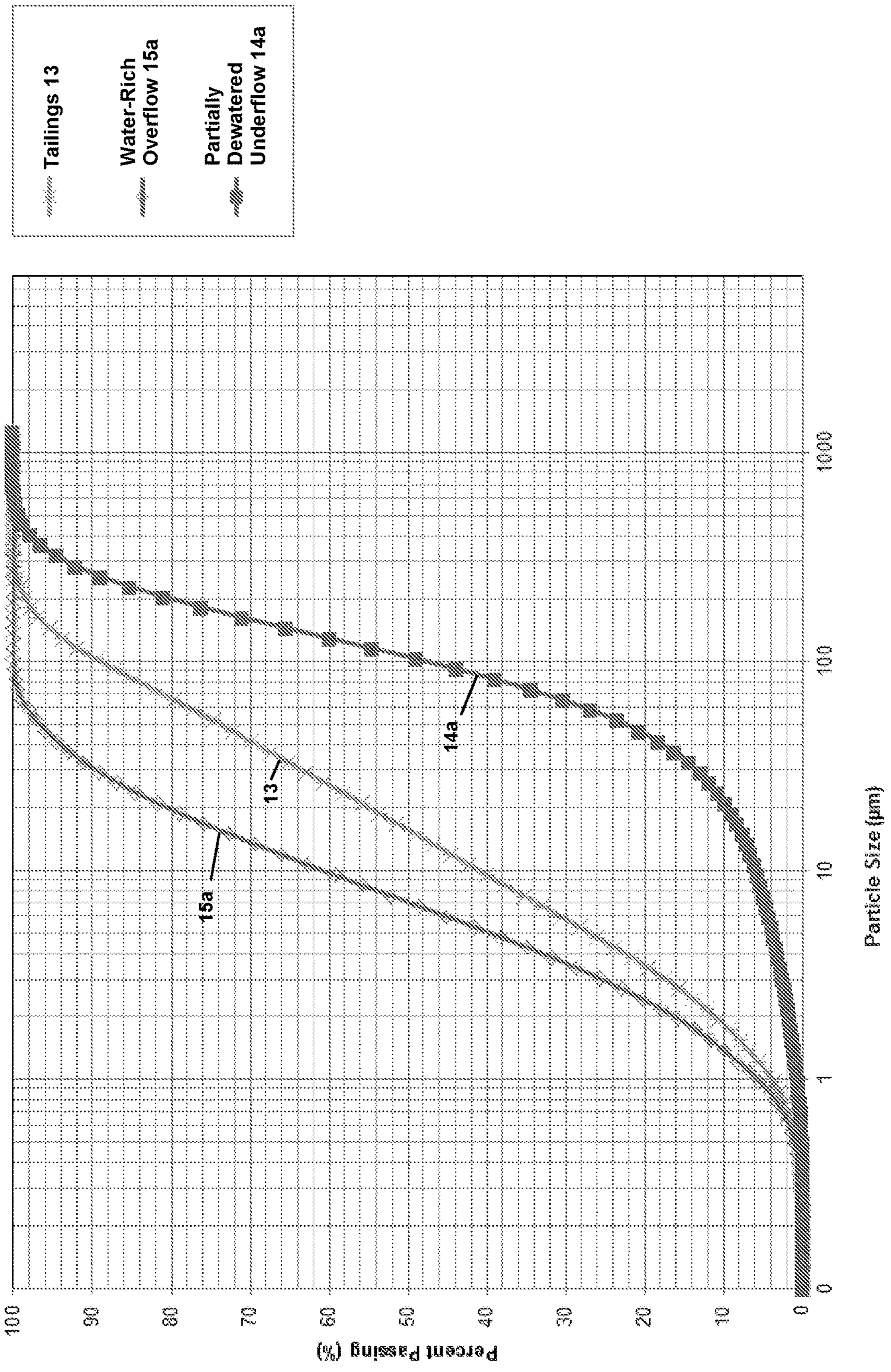
FIG. 6 shows the particle size distributions of the tailings, and the partially dewatered underflow and a water-rich overflow of the first stage of hydrocyclonic separation of the fifth embodiment.

FIG. 6 illustrates the change in the particle size distribution between the original tailings 13, the partially dewatered underflow 14*a*, and the water-rich overflow 15*a*. It can be seen that the partially dewatered underflow 14*a* has a coarser particle size distribution, while the water-rich overflow 15*a* has a finer particle size distribution than the tailings 13.

The water-rich overflow 15*a* is pumped into an agitated tank 24' and then pumped, using pump $P_2$, to the second (and final) hydrocyclonic separation sub-unit 10*b*. The second hydrocyclonic separation sub-unit 10*b* comprising at least one Cavex® 100CVX hydrocyclone. In the second hydrocyclonic separation sub-unit 10*a*, the water-rich overflow 15*a* is separated into a partially dewatered underflow 14*b* and a water-rich overflow 15*b*.

The feed inlet pressure for the second hydrocyclonic separation sub-unit 10*b* is 1000-1100 kPa, and the solids recovery to the partially dewatered underflow 14*b* is 20%. The properties of the partially dewatered underflow 14*b* are shown in Table 5 below.

TABLE 5

| Partially Dewatered Underflow 14b Properties Property | |
|---|---|
| Solids (t/h) | 4 |
| Water (t/h) | 1 |
| Slurry ($m^3$/hr) | 3 |
| Solids Concentration (% w/w) | 74 |
| Relative Density (g/$cm^3$) | 1.876 |

The properties of the water-rich overflow 15*b* are shown in Table 6 below.

TABLE 6

| Water-Rich Overflow 15b Properties Property | |
|---|---|
| Solids (t/h) | 16 |
| Water (t/h) | 84 |
| Slurry ($m^3$/hr) | 90 |
| Solids Concentration (% w/w) | 16 |
| Relative Density (g/$cm^3$) | 1.112 |

Figure 7:
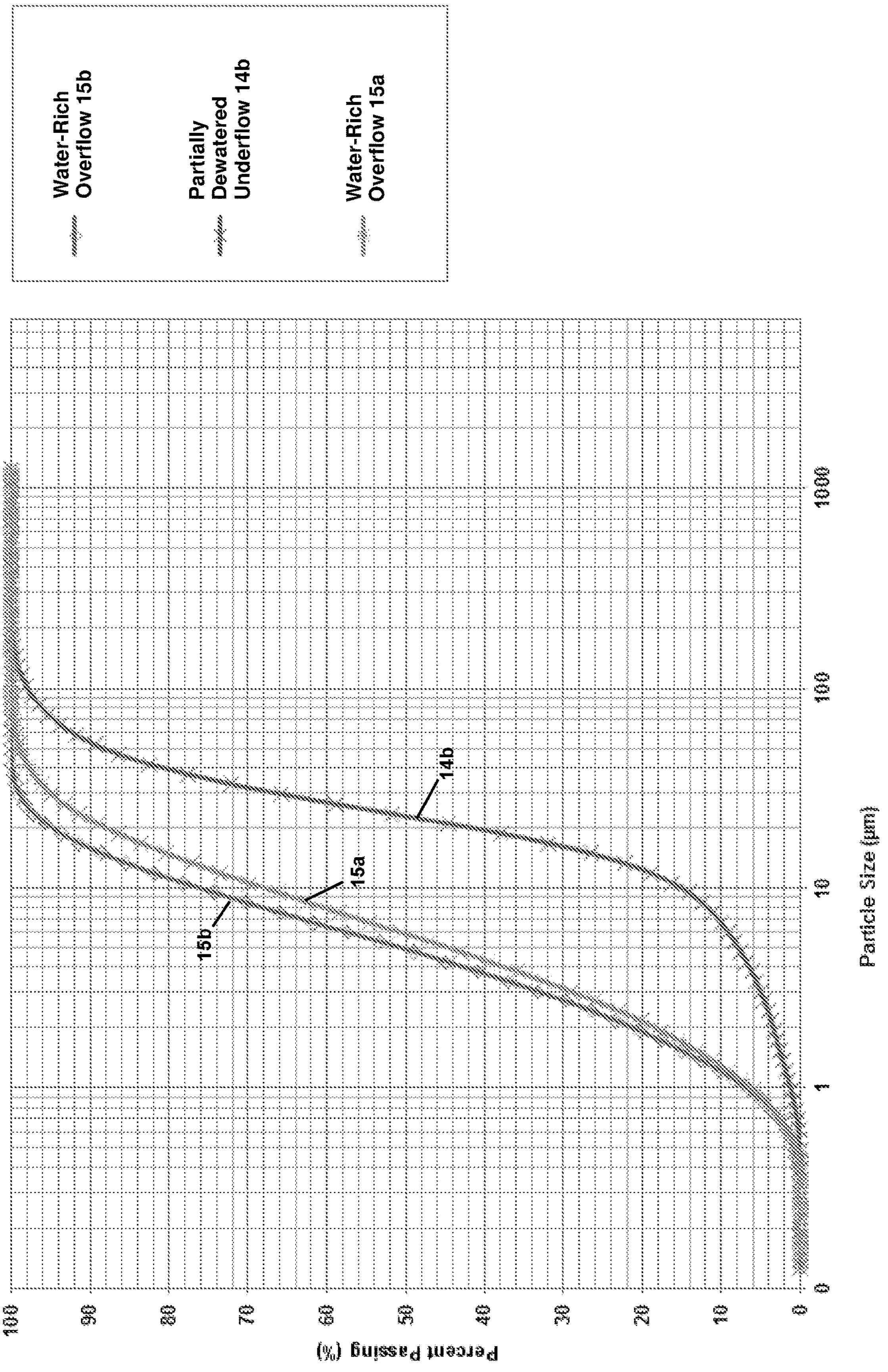
FIG. 7 shows the particle size distributions of the water-rich overflow of the first stage of hydrocyclonic separation, and the partially dewatered underflow and a water-rich overflow of the second stage of hydrocyclonic separation of the fifth embodiment.

FIG. 7 illustrates the change in the particle size distribution between the water-rich overflow 15*a*, the partially dewatered underflow 14*b*, and the water-rich overflow 15*b*. It can be seen that the partially dewatered underflow 14*b* has a coarser particle size distribution, while the water-rich overflow 15*b* has a finer particle size distribution than the water-rich overflow 15*a*.

The water-rich overflow 15*b* is delivered to the centrifuge 12. In this example, the centrifuge 12 is an SO1 solid bowl centrifuge manufactured by Andritz. The centrifuge 12 is operated at maximum bowl speed and minimum scroll speed. The water-rich overflow 15*b* is separated into a recovered water stream 22 and a low-water residue 17.

About 99.94% of the solids are recovered into the low-water residue 17. The properties of the low-water residue 17 are shown in Table 7 below.

TABLE 7

| Low-Water Residue 17 Properties Property | |
|---|---|
| Solids (t/h) | 16 |
| Water (t/h) | 6 |
| Slurry ($m^3$/hr) | 12 |
| Solids Concentration (% w/w) | 74 |
| Relative Density (g/$cm^3$) | 1.876 |

The properties of the recovered water stream 22 are shown in Table 8 below.

TABLE 8

| Recovered Water Stream 22 Properties Property | |
|---|---|
| Solids (t/h) | 0.05 |
| Water (t/h) | 78 |
| Slurry ($m^3$/hr) | 78 |
| Solids Concentration (% w/w) | 0.06 |
| Relative Density (g/$cm^3$) | 1.000 |

Figure 8:
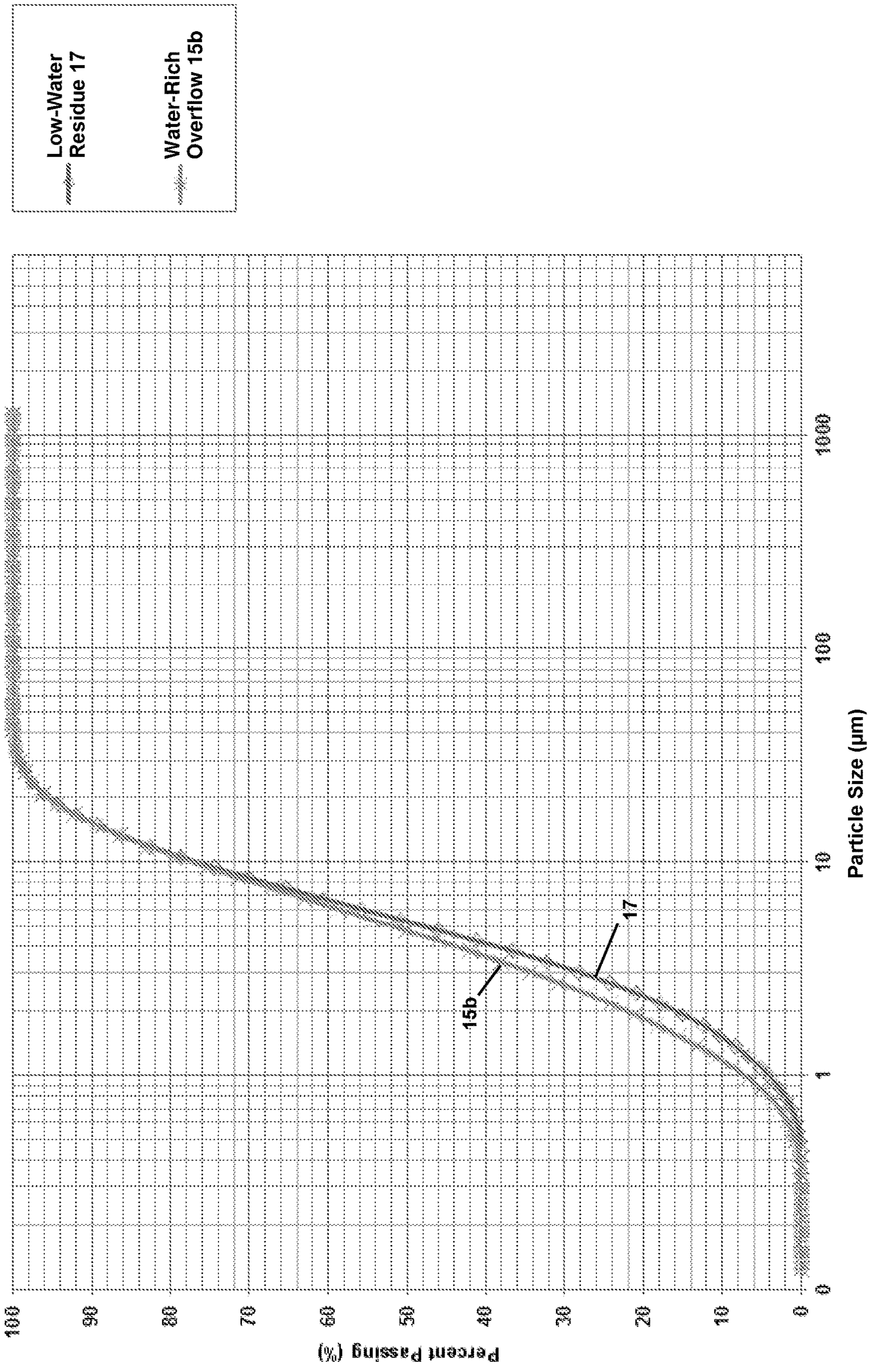
FIG. 8 shows the particle size distributions of the water-rich overflow of the second stage of hydrocyclonic separation, and the low-water residue of the fifth embodiment.

FIG. 8 illustrates the change in the particle size distribution between the water-rich overflow 15*a* and the low-water residue 17. It can be seen that there is only a slight change in the particle size distribution measured, reflecting that the vast majority of the solids from the water-rich overflow 15*a* are recovered into the low-water residue 17.

The recovered water stream 22 is be directed to the process water tank 25 before being sent, along a line, back to the mining operation that generated the tailings for reuse using a pump $P_3$.

The low-water residue 17 and the partially dewatered underflow 14*a*, 14*b* of each hydrocyclonic separation stage are mixed together with a mixer 18 to produce a stackable tailings residue. The stackable tailings residue is then pumped using a positive displacement pump 19 as a stackable tailings residue stream 20 to the tailings storage facility (not shown).

The properties of the stackable tailings residue stream 20 are shown in Table 9 below.

TABLE 9

| Stackable Tailings Residue Stream 20 Properties Property | |
|---|---|
| Solids (t/h) | 50 |
| Water (t/h) | 15 |
| Slurry ($m^3$/hr) | 33 |
| Solids Concentration (% w/w) | 77.5 |
| Relative Density (g/$cm^3$) | 1.957 |

Figure 9:
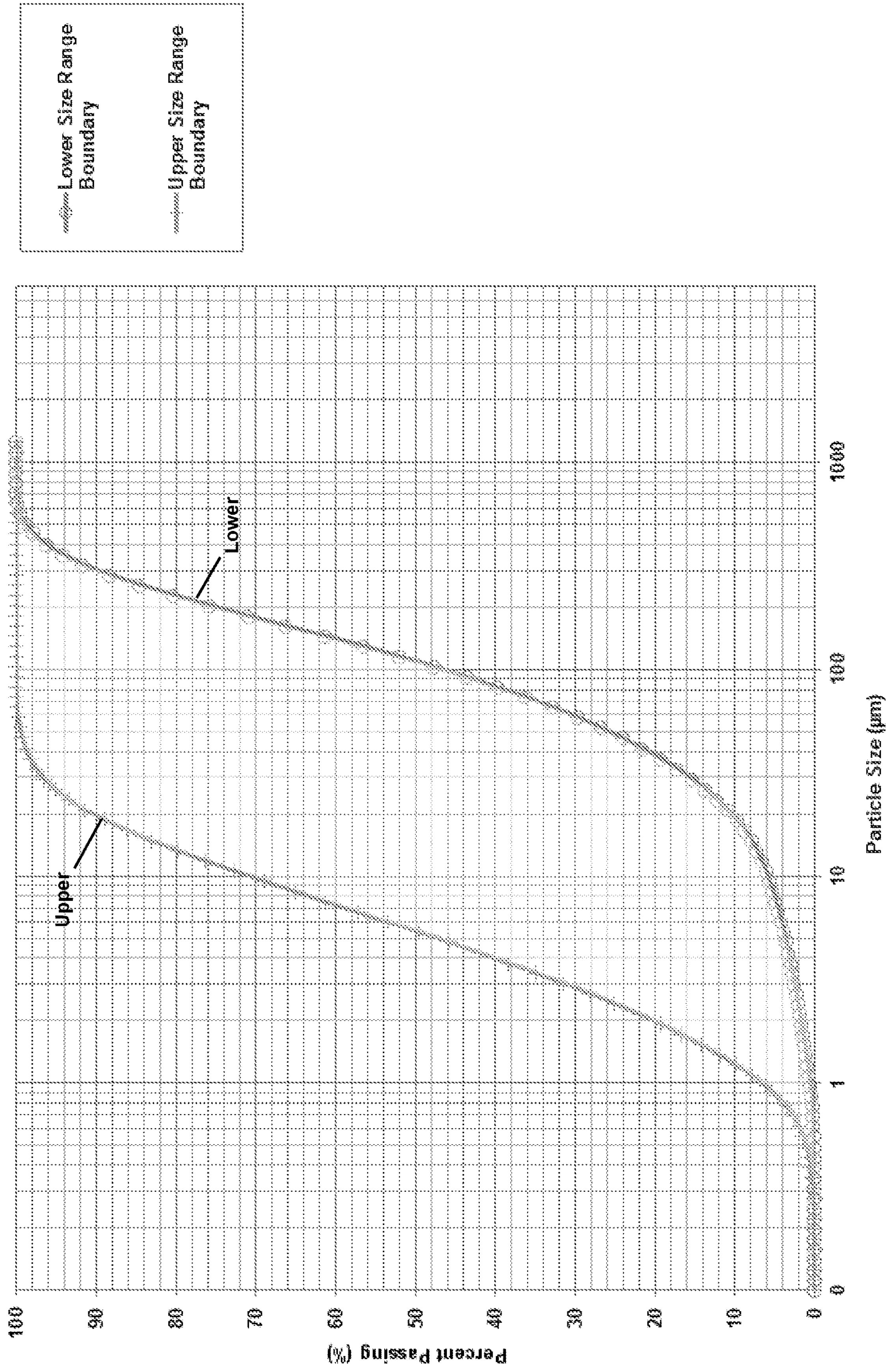
FIG. 9 shows the possible range of the particle size distributions for a stackable tailings residue of the fifth embodiment.

FIG. 9 illustrates the potential range of size distributions that can be exhibited by the stackable tailings residue stream 20, depending on the proportions of the low-water residue 17 and the partially dewatered underflows 14*a*, 14*b*. The upper bound of the range is the particle size distribution of the low-water residue 17, while the lower bound is the particle size distribution of the partially dewatered underflow 14*a* of the first stage of hydrocyclonic separation.

Figure 5:
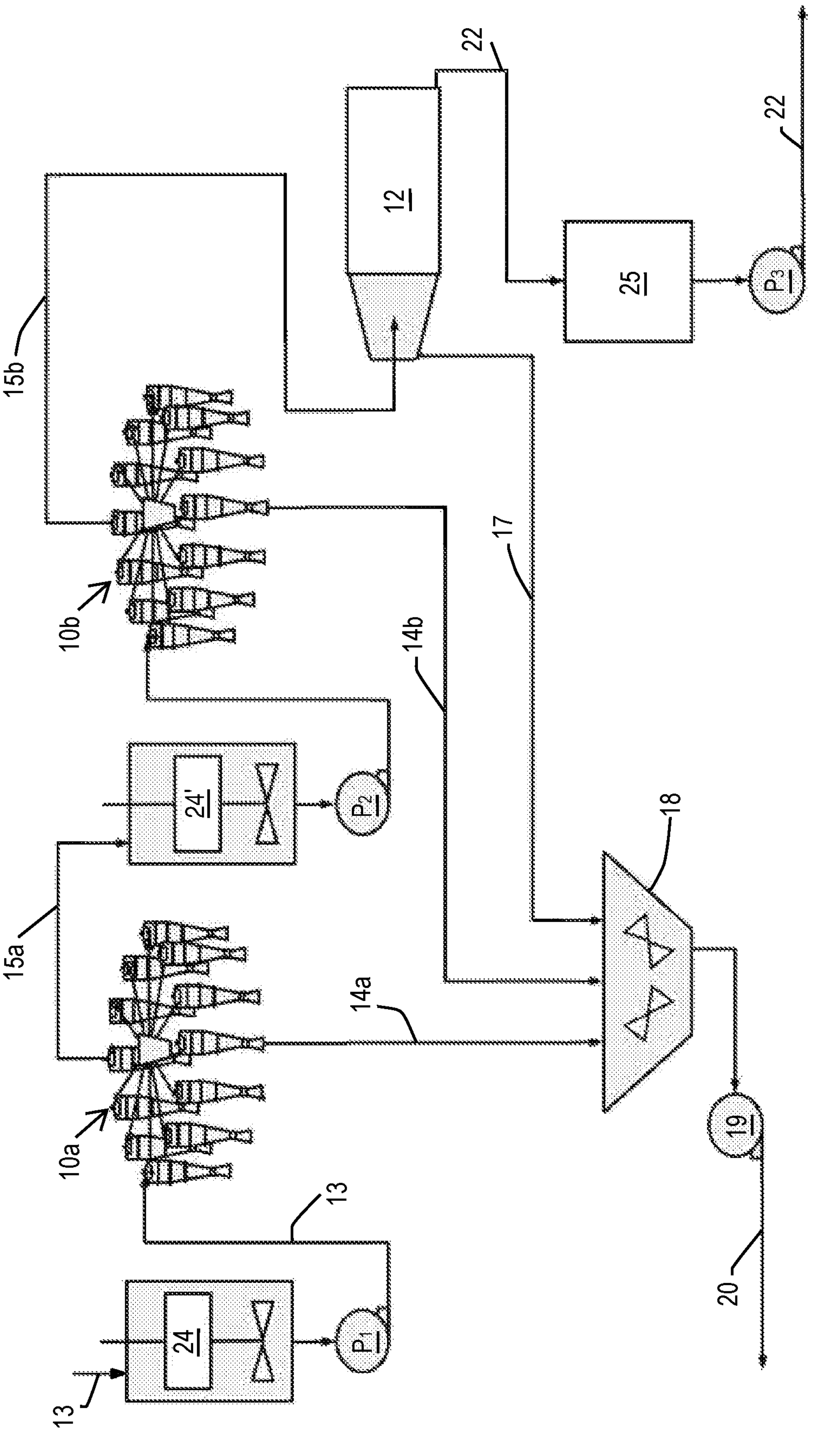
FIG. 5 is schematic illustration of a system in accordance with a fifth embodiment.
Figure 10:
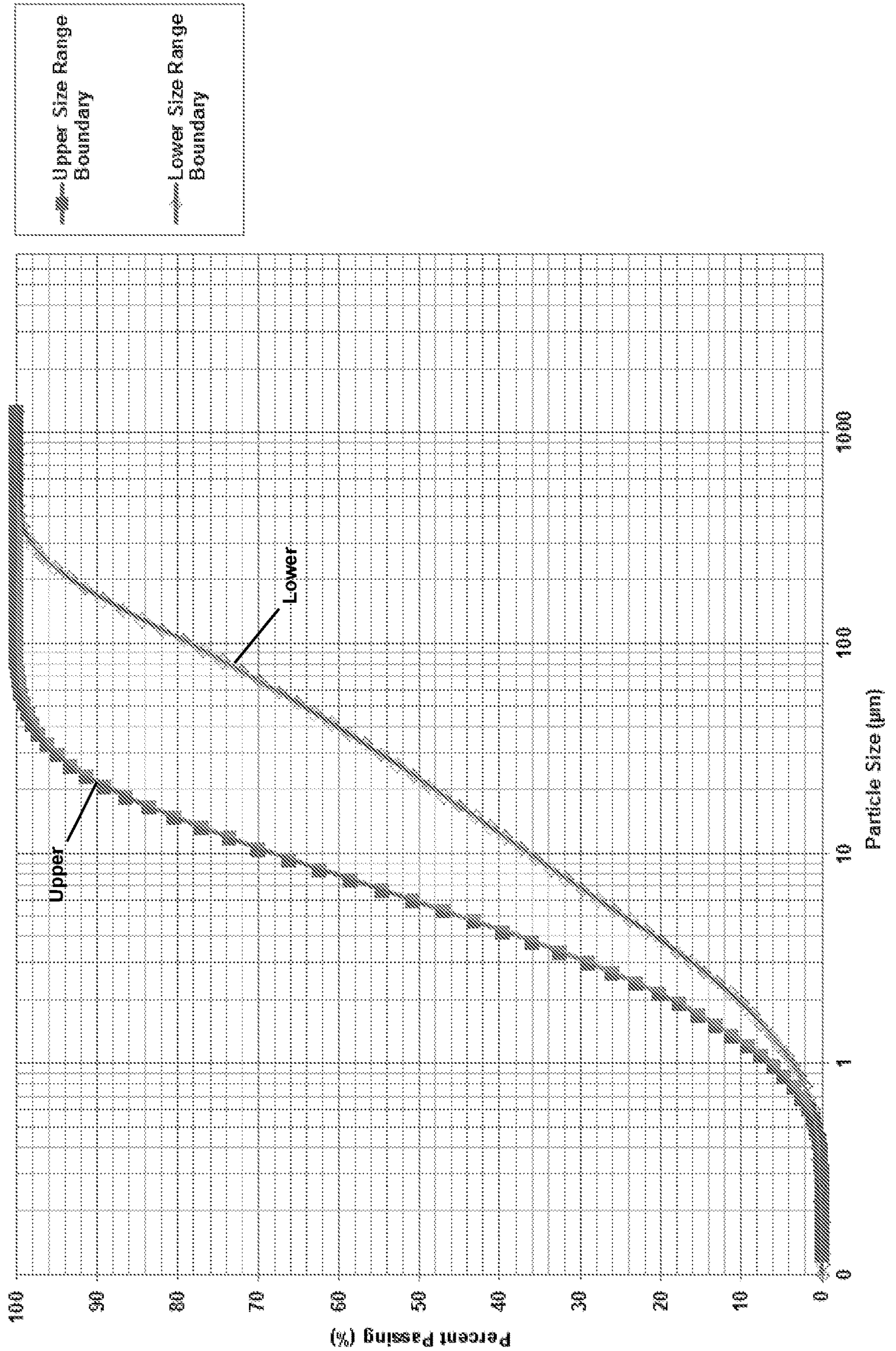
FIG. 10 shows the possible range of the particle size distributions for a stackable tailings residue of a sixth embodiment.

FIG. 10 illustrates how this potential range of size distributions change if the embodiment shown in FIG. 5 is modified to collect all the partially dewatered underflows 14*a* as a highly dewatered product. That is, if the embodiment of FIG. 5 is modified to bring it into line with the embodiment illustrated in FIG. 4 so that the partially dewatered underflows 14*a* is not combined with the low-water residue 17 and the partially dewatered underflow 14*b*. Instead, the stackable tailings residue is made from the low-water residue 17 and the partially dewatered underflow 14*b*. The upper bound of the range is the particle size distribution of the low-water residue 17, while the lower bound is the particle size distribution of the partially dewatered underflow 14*b* of the second (and final) stage of hydrocyclonic separation.

Example 2

Figure 11:
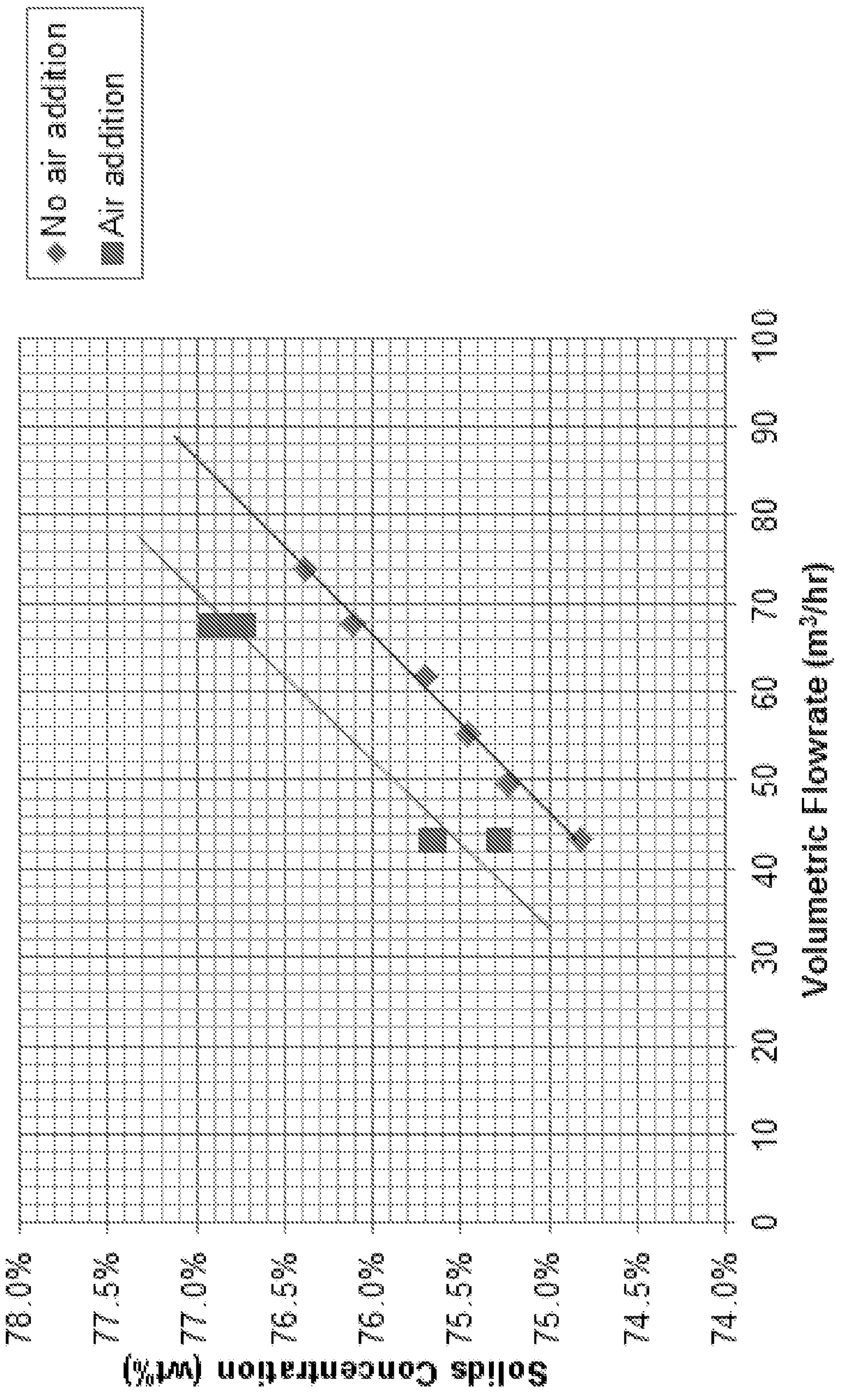
FIG. 11 shows the effect of air injection on the solids concentration of a hydrocyclone underflow.

To assess the effect of air injection on solids concentration in the hydrocyclone underflow, experiments were conducted using a Cavex® 150CVX hydrocyclone operating at a feed inlet pressure of 750 kPa. The tailings used in the experiments have the same mineral composition as that shown in Table 2, a solids concentration of 35% w/w and a Relative Density of 1.283 g/$cm^3$. Air was injected into the tailings stream at a rate of 18 $m^3$/hr. The air was injected prior to the hydrocyclone entrance flange, using an air ring around the periphery of the delivery pipe with a plurality of orifices through the pipe wall. The effect of air injection across a range of tailings flow rates is illustrated in FIG. 11. It can be seen that the use of air was associated with an increase in solids concentration in the underflow stream. In addition, the solids concentration in the underflow stream also increases with increases in tailings flow rate.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Embodiments have been described herein with reference to the accompanying drawings. However, some modifications to the described embodiments may be made without departing from the spirit and scope of the described embodiments, as described in the appended claims.

The invention claimed is:

1. A method of producing a dewatered tailings residue, comprising:

feeding tailings comprising a waste material that is the end result of a consecutive processing system in a mining operation, to a hydrocyclone at a feed inlet pressure ranging from 0.5 MPa to 1.5 MPa, subjecting the tailings to hydrocyclonic separation to produce one or more partially dewatered underflows and a final water-rich overflow;

separating the final water-rich overflow, by centrifuging, into a recovered water stream and a low-water residue wherein at least 96% of the solids contained in the final water-rich overflow are recovered in the low-water residue; and mixing together the low-water residue and at least part of the one or more partially dewatered underflows to produce the dewatered tailings residue, wherein the dewatered tailings residue has a solid content of 75 wt % to 90 wt %.

2. The method according to claim 1, wherein:

the tailings are subjected to a plurality of hydrocyclonic separation stages, including a first stage and a final stage;

each hydrocyclonic separation stage is configured to separate an input into one of the one or more partially dewatered underflows and the water-rich overflow;

the input of the first stage comprising the tailings;

the water-rich overflow of each stage preceding the final stage being an input to a next adjacent stage; and the final water-rich overflow is the water-rich overflow of the final stage.

3. The method according to claim 2, wherein at least some of the one or more partially dewatered underflows of one of the plurality of hydrocyclonic separation stages is collected as a highly dewatered product.

4. The method according to claim 3, wherein the stage from which the highly dewatered product is collected is the first stage of hydrocyclonic separation.

5. The method according to claim 1, wherein the dewatered tailings residue has a solids content of about 80 wt %.

6. The method of producing a dewatered tailings residue according to claim 5, further comprising pumping the dewatered tailings residue to a disposal site.

7. The method according to claim 1, further comprising:
injecting gas into the tailings, before the tailings are fed to the hydrocyclone, at a pressure higher than the feed inlet pressure.

8. The method according to claim 7, wherein injecting gas comprises injecting up to 60 $m^3$/hr of gas into the tailings.

9. The method according to claim 7, wherein the gas is air.

10. The method according to claim 1, wherein the dewatered tailings residue contains a final solid content of greater than 85 wt %.

11. The method according to claim 1, wherein the low-water residue has a solids content of at least 60 wt %.

12. The method according to claim 1, wherein the recovered water stream has a solids content of 1 wt % or less.

13. The method according to claim 1, wherein the recovered water stream is directly reused in the consecutive processing system in a mining operation which produced the tailings.

14. The method according to claim 1, wherein the amount of solids contained in the final water-rich overflow is less than 50% of the total solids from the tailings.

* * * * *